United States Patent
Tupper et al.

(10) Patent No.: US 8,076,814 B2
(45) Date of Patent: Dec. 13, 2011

(54) BRUSHLESS HIGH-FREQUENCY ALTERNATOR AND EXCITATION METHOD FOR DC, SINGLE-PHASE AND MULTI-PHASE AC POWER-FREQUENCY GENERATION

(75) Inventors: Christopher N. Tupper, Harpswell, ME (US); Duncan G. Wood, Harpswell, ME (US)

(73) Assignee: Raven Energy Alternatives, LLC, Brunswick, ME (US)

( * ) Notice: Subject to any disclaimer, the term of this patent is extended or adjusted under 35 U.S.C. 154(b) by 258 days.

(21) Appl. No.: 12/614,157

(22) Filed: Nov. 6, 2009

(65) Prior Publication Data
US 2010/0052626 A1 Mar. 4, 2010

Related U.S. Application Data

(63) Continuation-in-part of application No. 11/626,713, filed on Jan. 24, 2007, now Pat. No. 7,615,904.

(51) Int. Cl.
*H02K 1/00* (2006.01)
(52) U.S. Cl. .................................. 310/179; 310/180
(58) Field of Classification Search .......... 310/179–180, 310/184, 187, 159–161, 169–171
See application file for complete search history.

(56) References Cited

U.S. PATENT DOCUMENTS

| | | | | |
|---|---|---|---|---|
| 4,517,500 A | * | 5/1985 | Gotal et al. | 318/130 |
| 4,628,393 A | * | 12/1986 | Griesen | 361/3 |
| 4,965,481 A | * | 10/1990 | Kashiyama | 310/316.02 |
| 6,815,934 B2 | * | 11/2004 | Colley | 322/47 |
| 7,071,657 B2 | * | 7/2006 | Tupper et al. | 322/29 |
| 7,215,098 B2 | * | 5/2007 | Harris et al. | 322/24 |
| 7,339,284 B2 | * | 3/2008 | Manchester | 290/42 |
| 7,615,904 B2 | * | 11/2009 | Tupper et al. | 310/179 |

* cited by examiner

*Primary Examiner* — Thanh Lam
(74) *Attorney, Agent, or Firm* — Verrill Dana, LLP; Chris A. Caseiro

(57) ABSTRACT

A method is disclosed for arranging and exciting the stator, rotor and various windings of a multi-stage brushless high frequency alternator so that the resulting multiple high frequency sub-phase armature winding outputs can be rectified and commutated into desired phases of power-frequency alternating current (AC) electrical output, including single-phase, split-phase, three-phase and other multiple phase output. Power frequency currents in field windings control output amplitude, output frequency, and output phase. If desired, DC power output can be accommodated as zero power-frequency operation. Devices incorporating this arrangement are suitable of generating fixed frequency electrical power while accommodating variable speed rotation of a generator shaft and offer multiple advantages over existing techniques. The capability to generate speed independent electric power allows natural power sources such as windmills and hydropower stations to be efficiently coupled to fixed frequency power grids.

9 Claims, 13 Drawing Sheets

BRUSHLESS HIGH-FREQUENCY ALTERNATOR AND EXCITATION METHOD FOR DC, SINGLE-PHASE AND MULTI-PHASE AC POWER-FREQUENCY GENERATION

CROSS REFERENCE TO RELATED APPLICATION

This application is a continuation-in-part, and claims the priority benefit, of U.S. nonprovisional patent application Ser. No. 11/626,713, filed Jan. 24, 2007, entitled "Brushless High-Frequency Alternator and Excitation Method for Three-Phase AC Power-Frequency Generation" of the same named inventors and assigned to a common assignee. The content of that application is incorporated herein by reference.

BACKGROUND OF THE INVENTION

1. Field of the Invention

This invention relates generally to high-frequency alternators used to generate electrical power, and more specifically to power-frequency generators suitable for use with variable shaft speed, and, more particularly, to three-phase power-frequency generators suitable for use with variable shaft speed.

2. Description of the Prior Art

Power-frequency electrical generation provides alternating current and voltage at power-frequencies common to utility "grid" networks, (generally 60 Hz alternating current (AC) in the United States, or 50 Hz AC in many other areas). Devices for this purpose can be single phase, or, more commonly in larger grid connected networks, three-phase systems where three individual single phases operate in concert but each phase is displaced by one third of a power-frequency electrical cycle from the other two phases.

Power-frequency electrical generation generally relies upon either synchronous devices, where the shaft speed is directly tied to the required output electrical frequency, or relies on "asynchronous" induction devices where the shaft speed "slips" within a very small range relative to the synchronous speed. Neither of these approaches allows for true variable speed operation, which would be convenient for highly variable power sources such as wind or hydro-power. Furthermore, these approaches do not allow for variable speed operation to maximize the fuel efficiency of power sources such as internal combustion engines operating at partial load.

Another variable speed approach, the doubly-fed or wound rotor induction generator (WRIG) can be economically employed at the multi-megawatt power level. This approach requires a large portion of the power (approximately 15-25%) to be carried to three-phase AC windings on the rotor for excitation purposes. The power connection to the rotor is usually accomplished by slip rings and the rotor power is a variable frequency three-phase excitation that must be carefully controlled to compensate for the variable speed of the rotor shaft. This rotor power can be provided by a high power variable-frequency converter. Both the inductive generators and WRIG systems rely on a grid interconnection to provide external excitation currents of substantial magnitude.

Another approach to power-frequency electrical generation is to use high-frequency alternators to generate high-frequency alternating current that is rectified into a direct current (DC) voltage supply that is then re-formed by switching power electronics (generally inverters and power-frequency converters) into power-frequency AC electrical power. This approach allows power-frequency generation using alternators with variable shaft speed. Disadvantages of this approach include the cost, efficiency penalties, heat loss and complexities of the rectification and high-frequency switching processes of the power electronics.

A distinct "field-excitation" approach, is detailed by Hilgendorf in U.S. Pat. No. 3,916,284 and Tupper in U.S. Pat. No. 6,051,959. In this approach the field of a poly-phase high-frequency alternator is modulated by a sinusoidal excitation current, at the desired power-frequency, and shapes the rectified output into a rectified power-frequency output waveform. The rectification can be done by simple diodes or thyristors sometimes referred to as silicon-controlled rectifiers (SCRs) using natural commutation, in contrast to the so called "hard switching" of inverters, thereby minimizing switching losses and stresses on the power electronics. Minimal additional electronics are needed for commutation to unfold the rectified sinusoidal voltage into the desired bipolar power-frequency sinusoidal (AC) waveform and this commutation can be done as the output currents approach zero, resulting in minimal losses. Using the resonant excitation techniques of U.S. Pat. No. 6,051,959, the field excitation approach can be configured to consume minimal power for excitation. Commercial systems of this type are available in which excitation power requires about 2% of the output power. The low excitation power requirement enhances the efficiency of the system, and, importantly, reduces the waste heat and the attendant dissipation issues. Since a grid connection is not required for excitation, these systems can be used for stand-alone operation. These field excitation approaches avoid many of the disadvantages of the inverter based systems while maintaining the variable speed advantages of the high-frequency alternator approach.

To date, these field excitation approaches have focused on single-phase power-frequency generation devices making this technique mostly suitable for moderate power levels for stand-alone and mobile applications not generally intended to be connected to the utility grid.

In U.S. Pat. No. 6,133,669, Tupper shows the importance of low loss magnetic cores to accomplish AC excitation of the field in high-frequency alternators. Further, in U.S. Pat. No. 6,177,746, Tupper and Wood show how a brushless high-frequency alternator can be arranged with axial air gaps and essentially axial magnetic flux flow to provide the low loss magnetic core and the low output inductance required for successful power-frequency modulation of the field for a single phase device. However, the axial magnetic flux flow of the latter device imposes the need for an axial return path for the magnetic flux, increasing the size and complexity of the alternator device.

OBJECTS OF THE INVENTION

It is a primary object of the present invention to produce an apparatus to produce three-phase fixed power-frequency electrical power from the variable speed mechanical rotation of one or more shafts using high-frequency-alternator stages without the use of inverters.

It is a second object of the present invention to create an apparatus in which each of the power-frequency output phases is created by the rectified output of multiple high-frequency subphases, wherein the output amplitude, frequency, and phase, of the three power-frequency output phases can be excited and controlled by currents within various field windings.

It is another object of the present invention to create an apparatus in which the three-phase power can be generated for either stand-alone operation or with output phase control for potential interconnection to an external three-phase fixed power-frequency grid in which equal line voltages L1, L2 and L3, are phase-separated by one third of a power-frequency electrical cycle.

It is another object of the present invention to create an alternator incorporating three power-frequency phases within a single high-frequency alternator device that allows variable speed shaft operation while maintaining three-phase power-frequency output.

It is also an object of the present invention to create an alternator with a magnetic core structure suitable for construction using laminated magnetic materials, and arranged such that the magnetic pathways are located within the plane of the laminates to provide a complete magnetic circuit for magnetic flux flow without reliance on adjacent laminates, in order to provide a low loss magnetic core to minimize eddy current losses and in order to make the alternator suitable for resonant excitation of the field.

It is another object of the present invention to create an alternator wherein minimal power is required to excite and control substantial amounts of three-phase power-frequency AC.

It is also an object of the present invention to produce an alternator suitable for brushless operation.

It is also an object of the present invention to produce an alternator with essentially radial and circumferential magnetic pathways and air gaps to minimize the size and complexity of the alternator device.

It is also an object the present invention to produce an alternator with the multiple discrete sectors of air gap magnetic excitation spaced around the circumference of the stator such that, at each sector, the time varying net air gap magnetic excitation 0level, and thereby the amplitude of the induced high-frequency voltage within that sector, corresponds to the desired time varying amplitude and phasing of one of the three desired power-frequency three-phase output phases, L1, L2, or L3, and to produce an alternator such that there are at least one such sector corresponding to each of the desired power-frequency output phases.

It is also an object of the present invention to create a flexible, general topology wherein the specifics of the design can be adjusted and optimized for high speed generation, such as micro-turbine operation, or low speed operation such as wind power applications, while maintaining a wide range of variable speed operation relative to the optimal speed.

SUMMARY OF THE INVENTION

The objects set forth above as well as further and other objects and advantages of the present invention are achieved by the embodiments of the invention described herein below.

The present invention provides a method for arranging and exciting the stator, rotor and various windings of a multi-stage brushless high frequency alternator so that the resulting multiple high frequency sub-phase armature winding outputs can be rectified and commutated into three phase power frequency AC electrical output. Power frequency currents in field windings control output amplitude, output frequency, and output phase. The apparatus of the present invention incorporating this arrangement are suitable of generating fixed frequency electrical power while accommodating variable speed rotation of a generator shaft and offer multiple advantages over existing techniques. The capability to generate speed independent electric power allows natural power sources such as windmills and hydro-power stations to be efficiently coupled to fixed frequency power grids.

The apparatus is established in several embodiments. Features common to the embodiments include a stator that contains multiple phases (typically three) of power frequency field excitation windings as well as multiple high frequency sub-phase armature windings. A variable reluctance type rotor couples the various stator windings providing brushless operation. Electrical currents in the power frequency field excitation windings establish magnetic fields that control the voltages induced in the high frequency sub phase winding when the rotor is moved.

The apparatus of the present invention includes a stator with a stator ring, wherein the stator may be made of low core loss magnetic material. The stator is configured with internal slots for field excitation windings arranged circumferentially around the interior of the ring. The stator also is configured with teeth and slots for high-frequency subphase windings spaced circumferentially around the interior of the ring in discrete sectors between the field coil winding slots.

The apparatus also includes a rotor fitted to a shaft and able to be turned by rotation of the shaft. The rotor may be made of low core loss magnetic material arranged to be held perpendicular to a shaft. The rotor has external teeth arranged circumferentially around the outer edge of the rotor alternating with non-magnetic sectors, which might be air filled or filled with non-conductive and non-magnetic fairing material for aerodynamic purposes.

In the present invention, the magnetic pathways of the rotor and the stator are primarily radial and circumferential in nature, including a radial air gap between the rotor and the stator. The pathways are arranged to minimize any axial flow of the magnetic flux as such axial flow would contribute to eddy current losses. The magnetic pathways of the rotor and the stator are arranged so that the magnetic core structure may be made entirely of laminated electrical steel or laminated magnetic steel with low core loss in order to minimize eddy current losses and hysteresis losses.

In the present invention, various field coil windings, formed to include axially oriented conductors, are spaced circumferentially around the interior of the stator. Electrical currents within these conductors act to magnetize the magnetic pathway of various sectors around the circumference of the device and excite magnetic flux paths. These magnetic paths are primarily radial and circumferential in nature. These pathways include circumferential sectors of the stator laminates, radial air gaps to the rotor (via rotor teeth), circumferential sectors of the rotor laminates, and radial air gaps, via rotor teeth, back to the stator to complete the circuit.

In the present invention, the arrangement of field coils and distribution of power-frequency field excitation currents among the field coil windings is designed to create a plurality of discrete sectors of air gap magnetic excitation (also known as magnetomotive force or "mmf") around the inner circumference of the stator. At each sector, the net air gap magnetic excitation will result from the synergy of the magnetic effects from electrical currents in the various field coil windings as they augment or cancel each other. The arrangement is designed such that the time varying air gap excitation levels of each sector correspond to individual ones of the desired three-phase power-frequency time varying output voltages L1, L2, L3, with at least one sector corresponding to each of the desired three-phase power-frequency output voltages. The arrangement is further designed such that the instantaneous air gap excitation levels of a given sector are essentially uniform along the circumference of the sector, which is distinct from the spatially distributed three-phase excitation of the mmf used in induction motors and generators.

Within each of the various circumferential sectors are multiple teeth and slots for windings of a plurality of sub-phase windings. Typically, there would be three subphase windings for each sector, with one or more "poles" per subphase winding. As the magnetic field within a particular sector is excited by the net air gap excitation induced by electrical currents in the field coil windings, rotation of the rotor teeth through the sector causes a "variable reluctance" or change in the local flux concentration within each subphase winding. This time varying change in magnetic flux produces an alternating subphase winding voltage proportional to the sector air gap excitation level and speed of rotation. The various subphases are arranged in sequence along the periphery of the sector circumference so that they each have their own high-frequency phasing of output voltage as the rotor moves. The output voltages and currents of the subphases are rectified into a single output phase with amplitude proportional to the net sector air gap excitation and rotor speed.

Modulation of the field currents at a chosen power-frequency will cause power-frequency modulation of the net air gap magnetic excitation within each sector, and magnetic flux intensity in the regions around the rotor teeth within that sector. This, in turn, causes power-frequency modulation of the alternating high-frequency subphase voltages within that sector and, thus, power-frequency modulation of rectified output voltage.

An externally powered control circuit excites the various field coil windings at the desired power-frequency to create and control a three-phase power-frequency output at the desired phasing and amplitude. One of several possible electronic commutation schemes acts to alternate the polarity of every other rectified peak of each phase, so the output is unfolded into bipolar sinusoidal AC phase current and voltage at the desired power-frequency, amplitude and phasing.

These and other advantages of the present invention will become apparent upon review of the following detailed description, the accompanying drawings and the appended claims.

DETAILED DESCRIPTION OF THE PREFERRED EMBODIMENTS

Figure 1:
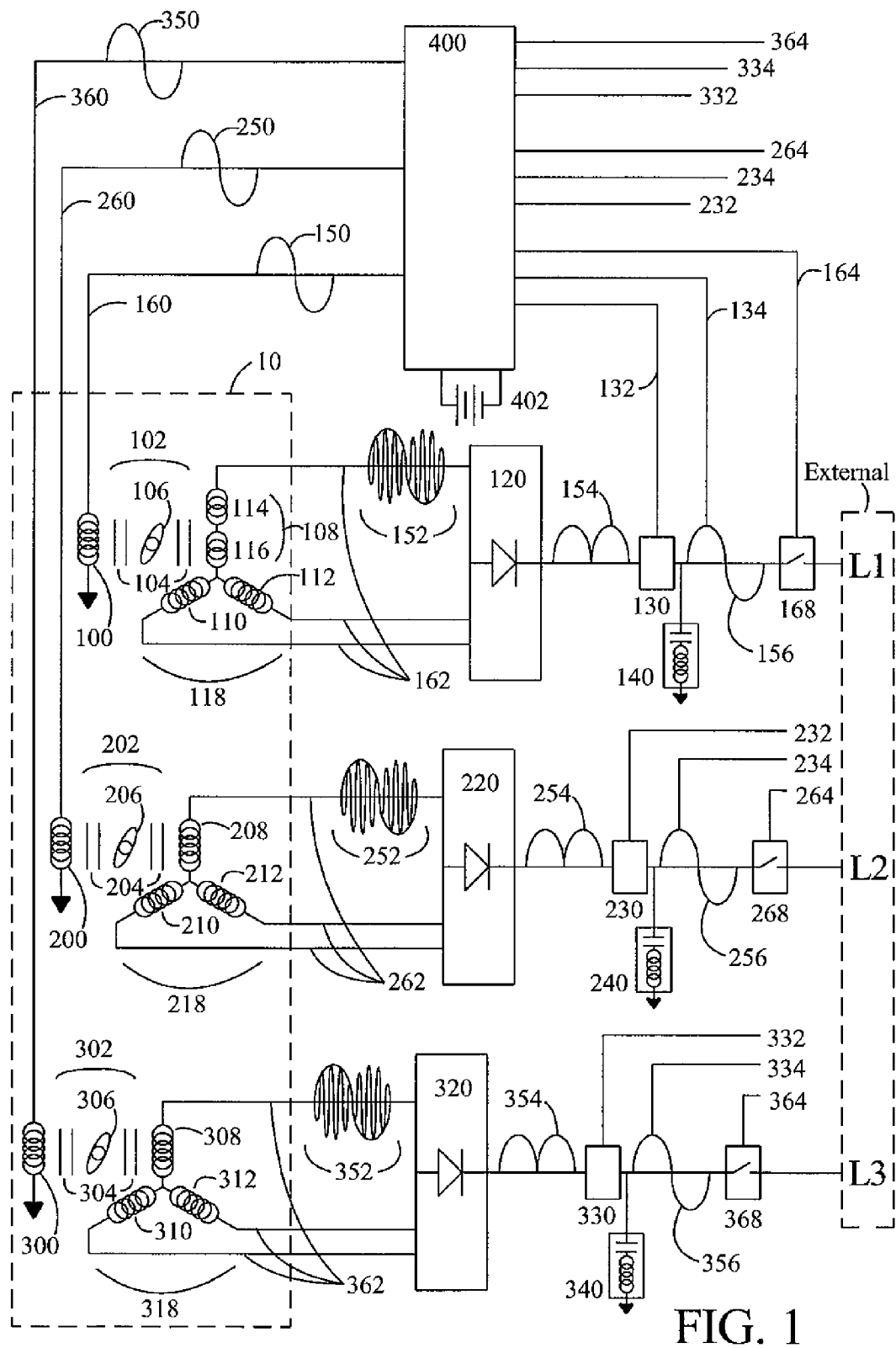
FIG. 1 shows a combined electric and magnetic schematic of the brushless high-frequency alternator and its electrical controls and connections to provide three-phase power-frequency AC electrical power suitable for connection to the distribution lines L1, L2 and L3 of a utility grid.

Referring to FIG. 1, a multi-stage high-frequency alternator 10 and excitation method for three-phase AC power-frequency generation of the present invention may be understood by first examining the general schematic arrangement of electrical connections and controls that couple it to a utility grid. For this preferred embodiment, FIG. 1 illustrates the arrangement for interconnection to an external three-phase fixed power-frequency grid in which equal line voltages L1, L2 and L3, are phase-separated from each other by one third of a power-frequency electrical cycle. It should be noted that this same configuration can be used for stand-alone applications, without grid connection, in which case L1, L2 and L3 represent respective three-phase external line loads.

The multi-stage high-frequency alternator 10 has a plurality of discrete field coil windings 100, 200 and 300 arranged so that electrical currents within each discrete field coil winding will excite magnetic flux within corresponding magnetic cores 102, 202 and 302. Magnetic core 102 includes a stationary portion 104 and a moveable portion 106 arranged so that relative motion between these portions will cause local magnetic intensity variations within magnetic core 102 due to variable reluctance in a manner that will be further described later. Magnetic cores 202 and 302 are similarly arranged and, due to the high degree of symmetry will only be briefly described. The multi-stage high-frequency alternator 10 also includes a plurality of high-frequency subphase windings 108, 110 and 112 magnetically coupled to field coil winding 100 via magnetic core 102. Subphase winding 108 may be composed of a plurality of interconnected individual subphase "pole" windings 114 and 116. Similarly, field coil winding 200 has associated magnetic core 202, and high-frequency subphase windings 208, 210 and 212. Also similarly, field coil winding 300 has associated magnetic core 302, and high-frequency subphase windings 308, 310 and 312.

High-frequency subphase windings 108, 110 and 112 may be wye (or "delta") interconnected into a intermediate alternator winding 118, and connected by cable means 162 to rectifier means 120 in a manner well understood and further described in U.S. Pat. No. 6,051,959, the entire content of which is incorporated herein by reference. A controller 400 uses cable means 160 and an external power source 402, which may be a battery, to excite power-frequency sinusoidal electrical currents 150 in field coil winding 100, to excite magnetic core 102. Relative motion between stationary magnetic core portion 104 and moveable magnetic core portion

106 will induce high-frequency subphase voltage 152 in high-frequency subphases 108, 110 and 112. The amplitude of the high-frequency subphase voltage 152 will be proportional to the magnitude of the current in the field coil winding 100. Rectified high-frequency output 154 is unfolded by the operation of a commutation circuit 130, which may be an H-bridge or other well understood circuits, as further described by Tupper in U.S. Pat. No. 6,051,959, in order to produce power-frequency AC output 156. Controller 400 is interconnected to the commutation circuit 130 by electric means 132 to achieve commutation as the output currents approach zero in order to achieve low switching losses. The power-frequency AC output 156 is fed back to controller 400 via sense line 134 to allow monitoring of the resulting amplitude and phase. Controller 400 is arranged to accomplish feedback control for adjustment of the resulting amplitude and phase of power-frequency AC output 156 through adjustments to the power-frequency sinusoidal electrical currents 150 in field coil winding 100. Power-frequency AC output 156 will have a small high-frequency rectification ripple that is well understood and may be easily filtered by a small passive filter 140. Controller 400 is interconnected by electrical means 164 to a grid interconnect means 168 that may include means for sensing the voltage and phase of external grid line L1, and switches, relays, transformers, protection devices and other well understood means for interconnecting the generator phase output to grid line (or external load) L1.

For the second phase of the desired three-phase power generation, controller 400 similarly excites and controls power-frequency AC output 256 for interconnection to grid line (or external load) L2. Power-frequency AC output 256 is maintained at a proper phase angle (approximately 120 degrees) from L1 via power-frequency sinusoidal electrical currents 250 in field coil winding 200 that excite high-frequency subphase voltages 252 in intermediate rectifier windings 218 for rectification in means 220 and commutation in means 230. Controller 400 is also interconnected by electrical means 264 to a grid interconnect means 268 that may include means for sensing the voltage and phase of external grid line L2, and switches, relays, transformers, protection devices and other well understood means for interconnecting the generator phase output to grid line (or external load) L2.

For the third phase of the desired three-phase power generation, controller 400 similarly excites and controls power-frequency AC output 356 for interconnection to grid line (or external load) L3. Power-frequency AC output 356 is maintained at a proper phase angle (approximately 120 degrees) from both L1 and L2 via power-frequency sinusoidal electrical currents 350 in field coil winding 300 that excite high-frequency subphase voltages 352 in intermediate alternator windings 318 for rectification in means 320 and commutation in means 330. Controller 400 is interconnected by electrical means 364 to a grid interconnect means 368 that may include means for sensing the voltage and phase of external grid line L3, and switches, relays, transformers, protection devices and other well understood means for interconnecting the generator phase output to grid line (or external load) L3.

It may understood that the function of the multi-stage high-frequency alternator 10, as presented so far in FIG. 1, may alternatively be accomplished by using three separate alternator stages or even separate alternators driven by a common shaft, or even possibly by three independent shafts. By reference to FIG. 2, further objects of the present invention may be understood by more detailed consideration of the physical arrangement of the brushless high-frequency alternator 10.

Figure 2:
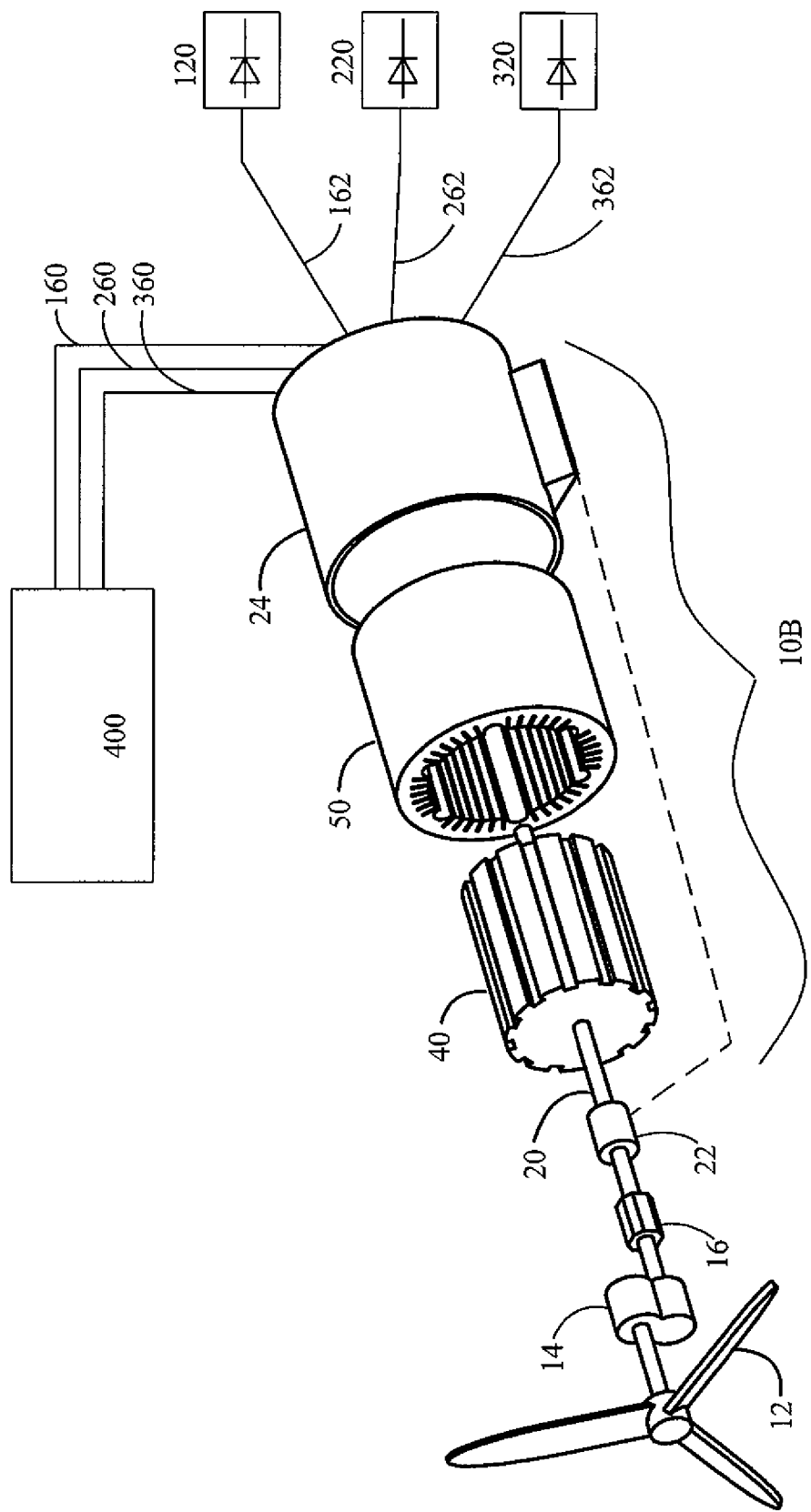
FIG. 2 shows an exploded view of the preferred embodiment of a single brushless high-frequency alternator indicating its major parts.

FIG. 2 shows a simplified exploded view of a physical embodiment of the multi-stage high-frequency alternator of the present invention identified therein as alternator 10B, as well as means for interconnection 16 to a source of rotary power 12, which might be a windmill or other variable speed driver, by way of an associated transmission 14, which might be gears or pulleys and belts to match the general speed range of the source of rotary power 12 to the general speed range of the high-frequency alternator 10B. The brushless high-frequency multi-stage alternator 10B includes an axial shaft 20, which is supported by means 22, which might be bearings and which allow rotation of shaft 20 relative to stationary means 24, which might be a case to hold the stationary elements of the alternator 10B in fixed position. The multi-stage high-frequency alternator 10B also includes a rotor 40 preferably made of low core loss magnetic material, but not limited thereto, attached to and rotated by the shaft 20, and an stator 50 also preferably made of low core loss magnetic material, but not limited thereto, and fixed to the stationary means 24. The multi-stage high-frequency alternator 10B also includes a plurality of field coil windings 100, 200 and 300 attached to the stator 50, and a plurality of the high-frequency subphase windings 108/110/112, 208/210/212, and 308/310/312 also attached to the stator 50. Brushless multi-stage high-frequency alternator 10B also includes cable means 160, 260 and 360 to electrically connect the various field coil windings 100, 200 and 300 to the controller 400, and other cable means 162, 262 and 362, to connect the high-frequency subphase windings to corresponding rectifier means 120, 220, and 320, respectively. Rotary power from source 12 causes shaft 20 to turn and rotor 40 to move relative to stator 50, this relative motion causes magnetic flux variations in the high-frequency subphase windings, to produce the high-frequency output voltages 152, 252 and 352.

Figure 3:
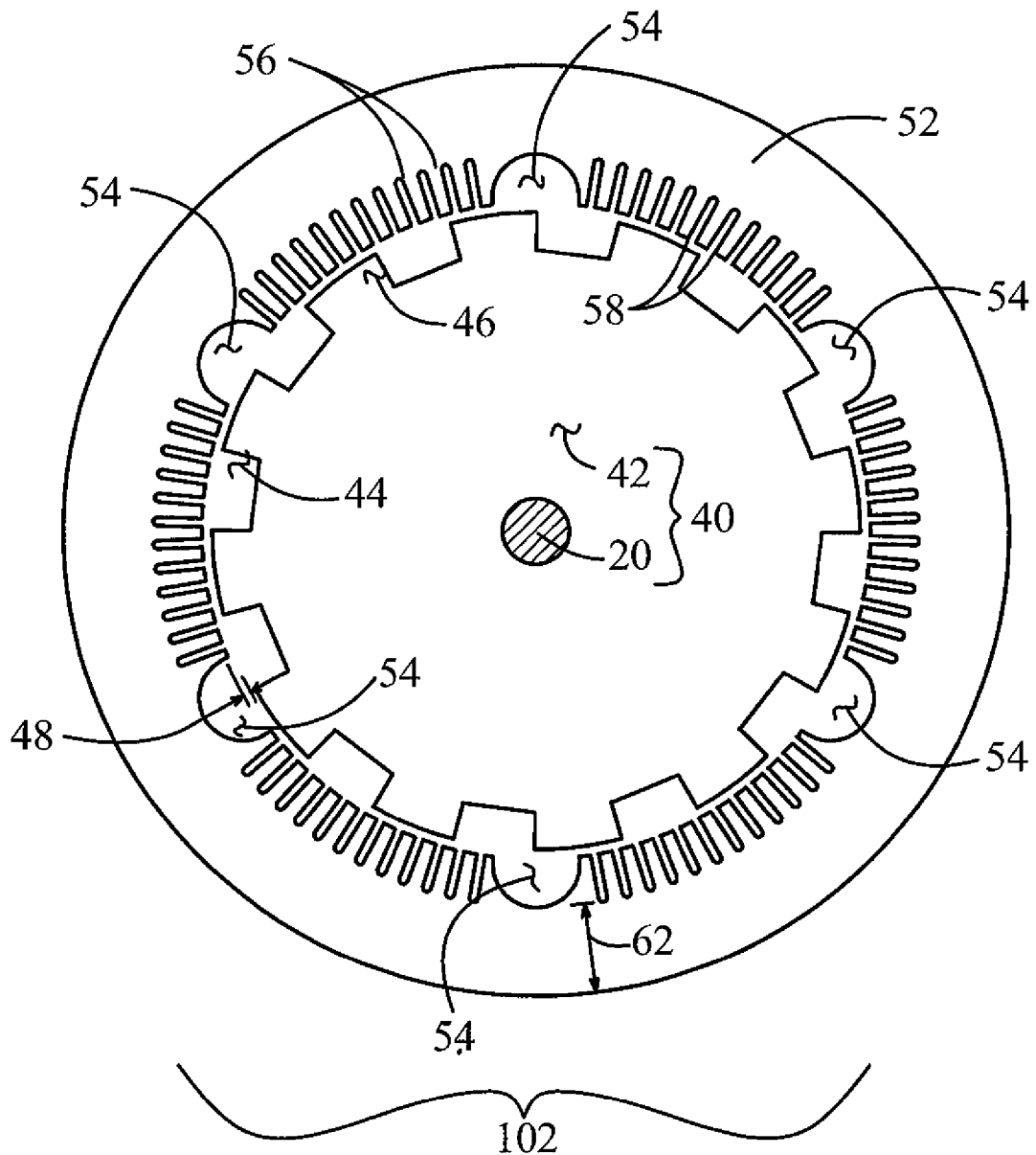
FIG. 3 shows a simplified end-on view of the single brushless high-frequency alternator showing shaft, rotor and stator.

Referring to FIG. 3, the brushless multi-stage high-frequency alternator 10B of the present invention also includes an axial shaft 20 and a low loss magnetic core 102 established by the combination of rotor 40 and stator 50.

The rotor 40 is preferably established as one or more axial rotor segments 42 formed of low core loss magnetic material, in order to minimize eddy currents. The rotor segments 42 may be fabricated as laminates fixed to, and able to rotate with, the shaft 20. The rotor 40 has a plurality of teeth 44 and non-magnetic slots 46 arranged in an alternating pattern preferably evenly spaced around the circumference of the periphery. In the preferred embodiment, the teeth 44 and non-magnetic slots 46 are of approximately equal circumferential dimension. The non-magnetic slots 46 may be air slots or may be filled with non-conductive and non-magnetic material other than air, if so desired, for aerodynamic smoothing.

The stator 50 is preferably established as one or more stator rings formed of low core loss magnetic material, in order to minimize eddy currents, as an axial stack of stator segments 52. The stator segments 52 may be fabricated as laminates separated from the rotor 40 by a radial air gap 48. That is, the stator rings as stator segments 52 are separated from corresponding segments 42 of the rotor 40 by the radial air gap 48. The outer circumference of the stator 50 provides backiron 62, which is magnetic material of sufficient radial depth to establish a circumferential pathway for magnetic flux. The inner circumference of the stator 50 has a plurality of field winding slots 54 spaced, preferably evenly, around the inner circumference. In sectors of the inner circumference of the stator 50, between the field winding slots 54, the stator 50 also has high-frequency subphase winding slots 56 spaced and interwoven with teeth 58, which provide magnetic coupling between the air gap 48 and the backiron 62.

Figure 4:
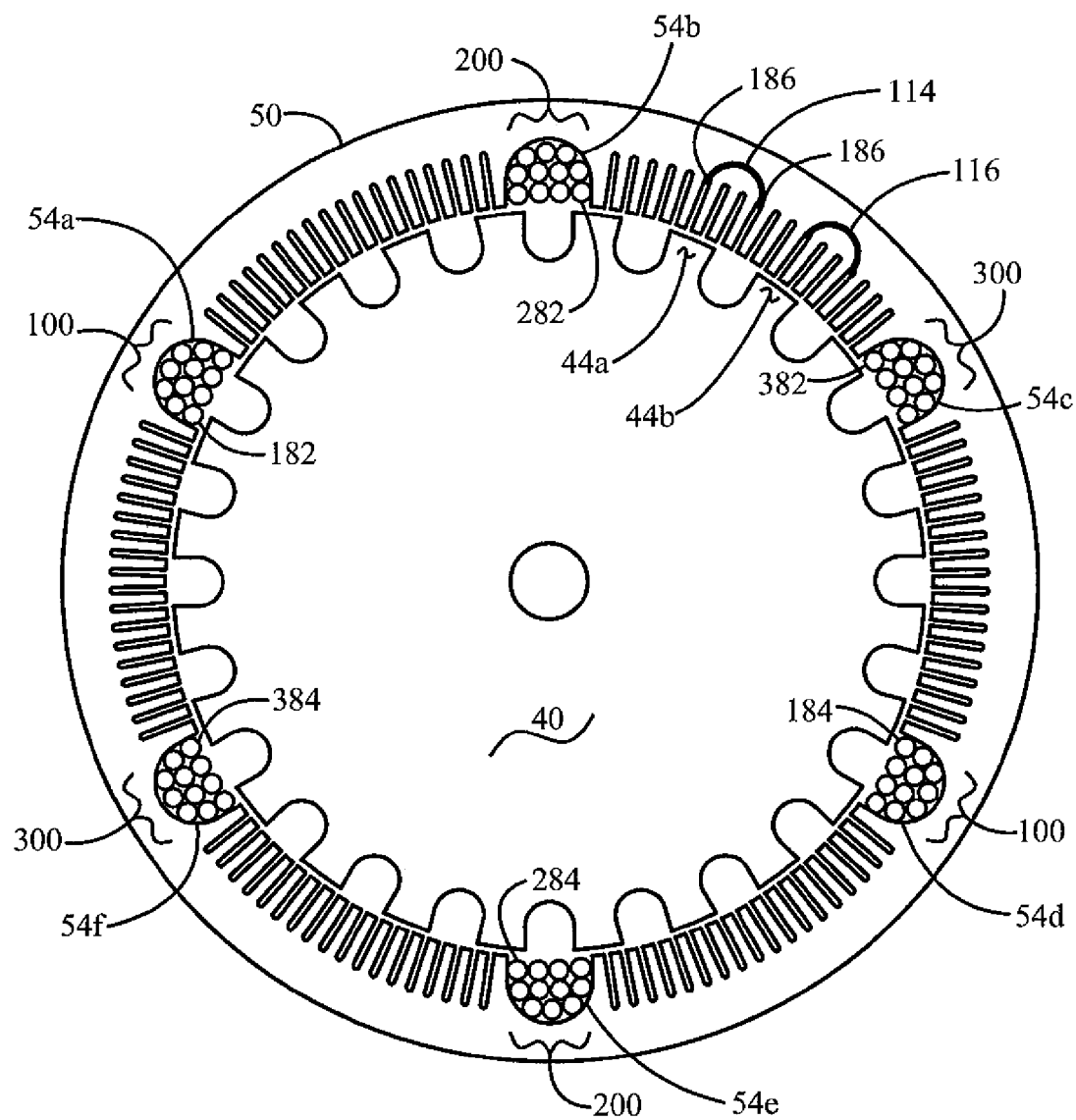
FIG. 4 shows a simplified end-on view of the stator and rotor and various windings.

Referring to FIG. 4, field coil winding 100, which is typical of the plurality of field coil windings, includes multiple insulated turns of first field coil winding passes 182 and second field coil winding passes 184 of conductive wire placed in the field winding slots 54. In the preferred embodiment, individual turns of first field coil winding passes 182 run axially through the length of the stator 50 in a first field winding slot 54a, and then are connected in series, via end loops, to individual turns of corresponding second field coil winding passes 184, which are located, in the preferred embodiment, in a second field winding slot 54d, diametrically opposite of first field coil winding passes 182, and which run in the opposite direction axially through the stator 50, and are then connected, in series, to next individual turns of first field coil winding passes 182, and so on.

Similarly, field coil winding 200 includes multiple insulated turns of first field coil winding passes 282 and second field coil winding passes 284 of conductive wire placed in diametrically opposing field winding slots 54b and 54e. Similarly, field coil winding 300 includes multiple insulated turns of first field coil winding passes 382 and second field coil winding passes 384 of conductive wire placed in diametrically opposing field winding slots 54c and 54f.

For the purposes of explaining the operation of a high frequency alternator, it is helpful to visualize the various field coil windings and high frequency windings to be arranged as discrete "poles" and serial windings "enclosing" a local area of the stator. It will be understood by those familiar with the art that the term "poles" in this context refers to only one of several methods that may be used to create the desired magnetic fields and windings for the generation of voltage and that other functionally equivalent methods of interconnection, such as wave winding, may also be used.

Typical of the plurality of subphase "pole" windings, individual subphase pole winding 114 includes multiple turns 186 of insulated conductive wire located in high-frequency subphase winding slots 56 and, in the preferred embodiment, the turns are located such that the portion of the inner circumference of the stator 50 effectively enclosed by the subphase pole winding 114 is about the same as the portion of the inner circumference of the rotor 40 taken up by each rotor tooth 44. Subphase pole winding 116 is a distinct but electrically equivalent winding shown as located in the same position, relative to the instantaneous rotary position of its nearest rotor tooth 44b, as subphase pole winding 114 has to its nearest rotor tooth 44a.

Figure 5:
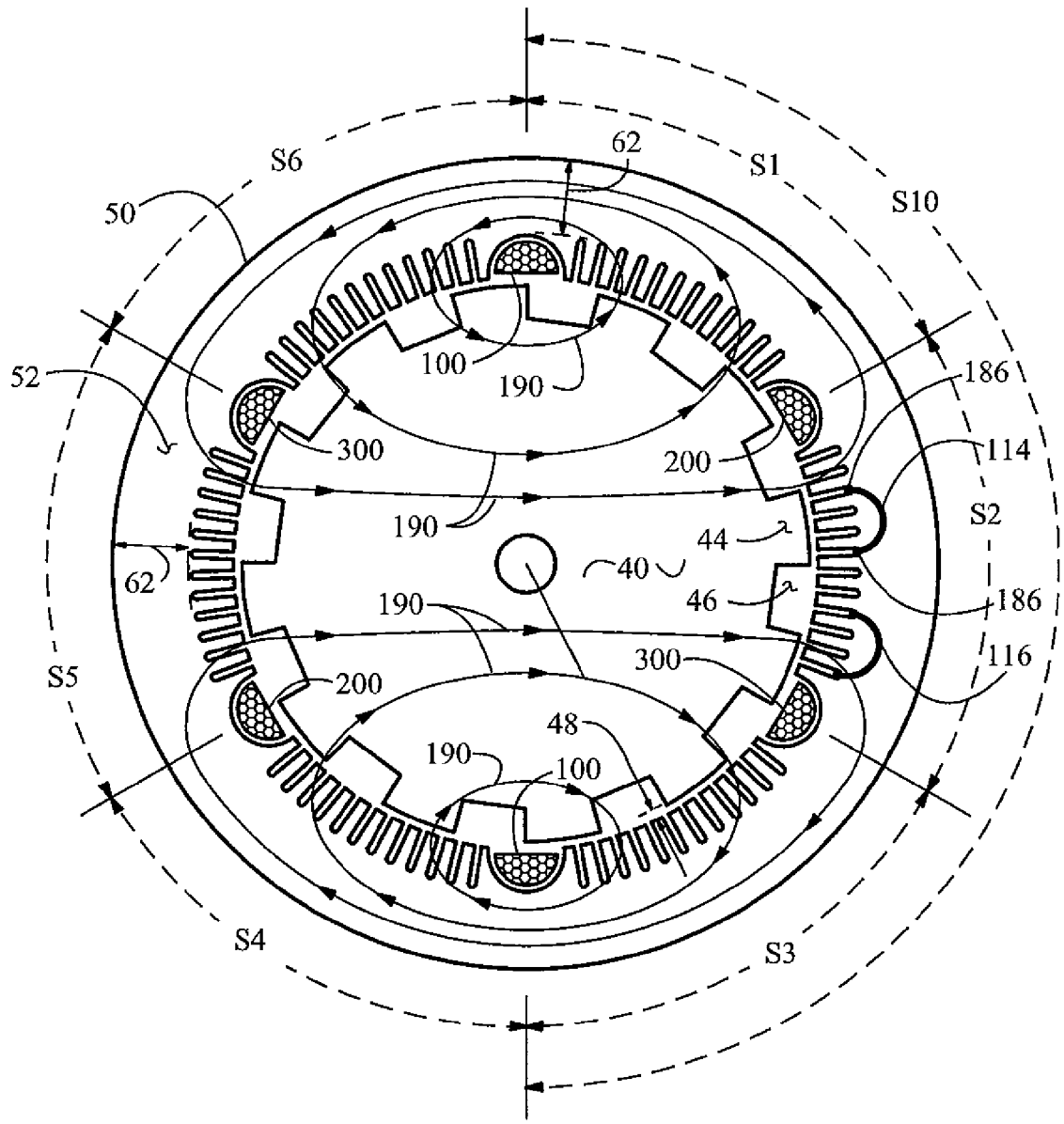
FIG. 5 shown a simplified end on schematic of the flow magnetic flux excited by field coil current in one field coil winding.

FIG. 5 shows the relative positions of field coils 100, 200 and 300 in a preferred embodiment of the invention. FIG. 5 also shows the symbolic lines of magnetic flux flow 190 in the rotor 40 and stator 50 due to excitation of field coil 100. It will be understood that the direction of the flux flow is dependent on the direction of electrical current flow within field coil 100, shown here as out of the plane of the diagram at the top of the figure and into the plane of the diagram at the bottom of the figure. It will be understood that similar patterns of magnetic flow are established with respect to field coils 200 and 300 when they are excited.

For the representation of the invention shown in FIG. 5, it is to be understood that, as long as the intensity of magnetic flux flow through each tooth 44 does not exceed the limit for magnetic saturation, then the flow of magnetic flux through any particular tooth 44 will be approximately the same as in other teeth 44 and will be proportional to magnetic reluctance of the local air gaps between each tooth 44 and the stator 50, and the excitation in field coil 100. It is also to be understood that it is generally desirable to provide magnetic pathways sized to avoid magnetic saturation, which may cause high losses and highly non-linear operation. Any portion of the magnetic pathway that is excited in excess of magnetic saturation becomes a bottleneck, limiting the performance of the device.

It may also be understood from FIG. 5 that magnetic flux lines 190 will be concentrated as they cross the air gap 48 near rotor teeth 44, relative to the concentration in the circumferential regions near the non-magnetic slots 46. It may be further understood that, as the rotor 40 is moved, the flux concentrations will move with the rotor teeth 44 relative to subphase pole windings such as subphase pole winding 114. This changing flux concentration will induce the generation of an alternating voltage within the subphase pole windings as the rotor teeth 44 pass by. The frequency of this alternation will be related to the shaft speed and number of rotor teeth 44, creating a "high-frequency" alternating electrical output, i.e., voltage or current.

Since the field coils 100, 200 and 300 and the subphase pole windings are all located on the stationary stator, and since there are no windings on the rotor 40, all wiring interconnections can be made without brushes, achieving brushless operation, which is one objective of the present invention. Furthermore, it will be noted that the magnetic flux lines 190 lie entirely within the plane of rotor laminates 42 and stator laminates 52, with essentially radial and circumferential pathways. This allows the use of laminated material in the magnetic core comprising the rotor 40 and the stator 50 to minimize the eddy current losses caused by time variations in flux intensity, thus achieving further objectives of the present invention.

It is desirable to size the backiron 62 shown in FIG. 5 so that it does not become a magnetic bottleneck. If, for example, at the level of magnetic excitation representing the threshold of magnetic saturation, there is schematically one line of flux 190 per rotor tooth 44, then it can be seen that the backiron 62 would have to be sized (in its radial dimension) for carrying, without saturation, at least the saturation flux load for one half of the rotor teeth 44 in sector S10, the circumference associated with field coil 100. (In this case the other half of the flux is carried in the other direction due to the effect of symmetry.) Since the circumferential dimension of each of the rotor teeth 44 is about the same as the circumferential dimension of the air slots 46, the backiron 62 must be sized to carry the saturation current for about one-quarter of the circumference of the sector S10 encompassed by field coil 100.

With continuing reference to FIG. 5, and in regard to the example described above, the circumference of the sector S10 encompassed by field coil 100 would be one half of the total circumference of the rotor 40, so the backiron 62 would have to be sized to carry the flux from one-eighth of the total circumference of the rotor. However, it will be shown that, by proper method of exciting and distributing electrical currents within field coils 100, 200 and 300, the net effect of magnetic flow can be altered so that the size of the backiron 62 can be reduce without risking saturation, thus providing the advantages of making the alternator 10B of smaller diameter than would otherwise be required, with less material and less weight. To understand this advantage of the present invention, FIG. 5 shows section sector S1, the shortest section of the circumference of the stator 50 between field coil 100 and field coil 200, and sector S2 the shortest section of the circumference of the stator between field coil 200 and field coil 300, and so on for sectors S3, S4, S5, and S6. It will be noted that the flux flow in sectors S1 and S2 and S3, due to the excitation current in field coil 100, is uniformly outward from the rotor 40 to the stator 50 (flux flow direction is understood here based on the convention of the "right hand rule"). It will also be noted that the flux flow in sectors S4 and S5 and S6, due to the excitation current in field coil 100, is uniformly inward from the stator 50 to the rotor 40.

Figure 6A:
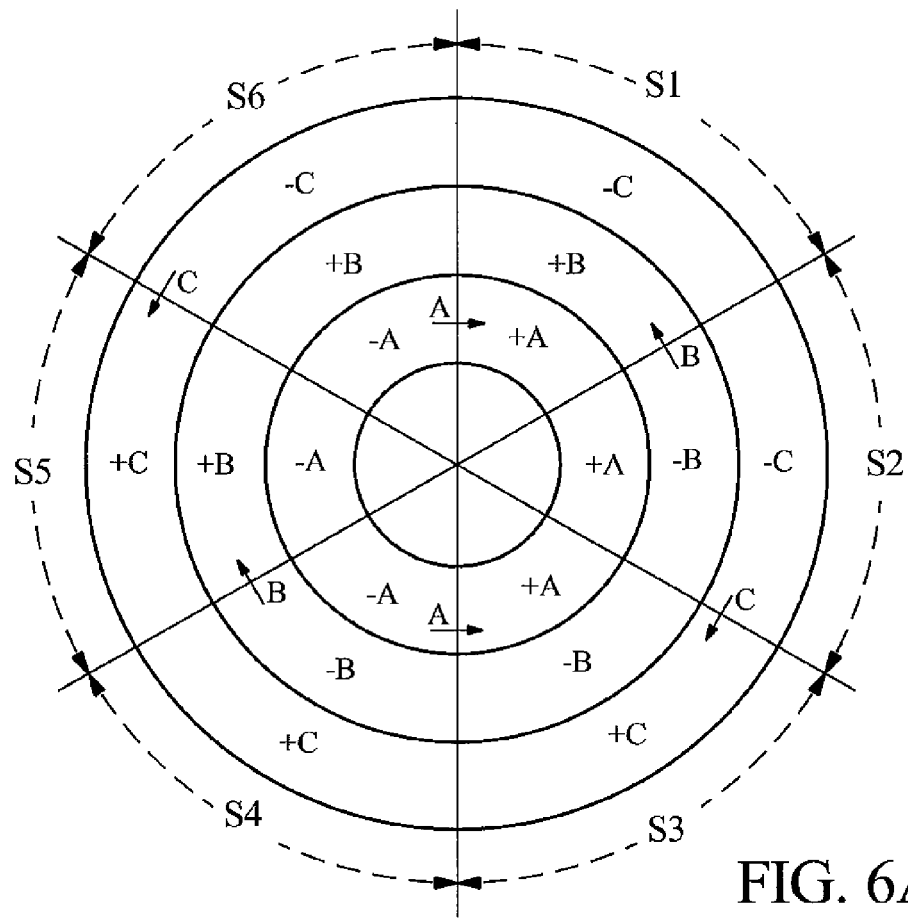
FIG. 6A shows a mathematical reference diagram for understanding the interaction of magnetic flux under the combined excitation of multiple field coils.

To further understand the importance of this advantage of the present invention, FIG. 6A shows a mathematical reference diagram for understanding the time varying distribution of magnetic flux within the rotor 40 and stator 50. The magnetic excitation "A" from field coil 100 is shown as (+A), representing flow from the rotor 40 to the stator 50, in sector S1, which corresponds to the shortest section of the circumference of the stator 50 between field coil 100 and field coil 200 of FIG. 4. The magnetic excitation is also shown as (+A) in sectors S2 and S3. Similarly, in sectors S4, S5, S6 the magnetic excitation A of field coil 100 is shown as (−A), representing magnetic flow from the stator 50 to the rotor 40. In a similar fashion, the magnetic excitation "B" of current in field coil 200, is shown for each sector, and the magnetic excitation "C" of current in field coil 300 is also shown for each sector. It will be understood by those skilled in the art that each magnetic excitation "A", "B", "C" will be proportional to the instantaneous level and polarity of electrical current in the corresponding field coil 100, 200 or 300. Furthermore it will be understood that the net magnetic excitation within each sector will be the algebraic sum of the instantaneous excitation from each field coil. Hence, in sector S1, the time varying magnetic excitation can be represented by the following equations:

$$ES1(t) = +A(t) + B(t) - C(t) \qquad \text{Equation 1}$$

Where: ES1(t) is the instantaneous net magnetic excitation in sector S1 at time (t).

Where A(t) is the instantaneous excitation from field coil 100

Where B(t) is the instantaneous excitation from field coil 200

Where C(t) is the instantaneous excitation from field coil 300

Similarly:

$$ES2(t) = +A(t) - B(t) - C(t) \qquad \text{Equation 2}$$

Where: ES2(t) is the instantaneous net magnetic excitation in sector S2 at time (t).

$$ES3(t) = +A(t) - B(t) - C(t) \qquad \text{Equation 3}$$

Where: ES3(t) is the instantaneous net magnetic excitation in sector S3 at time (t).

$$ES4(t) = -A(t) - B(t) + C(t) \qquad \text{Equation 4}$$

Where: ES4(t) is the instantaneous net magnetic excitation in sector S4 at time (t).

$$ES5(t) = -A(t) + B(t) + C(t) \qquad \text{Equation 5}$$

Where: ES5(t) is the instantaneous net magnetic excitation in sector S5 at time (t).

$$ES6(t) = -A(t) + B(t) - C(t) \qquad \text{Equation 6}$$

Where: ES6(t) is the instantaneous net magnetic excitation in sector S6 at time (t).

An objective of this invention can be realized if the excitation in field coils 100, 200 and 300 is arranged so that each field coil is excited by sinusoidal electrical currents of equal amplitude at the desired power-frequency ω but where each field coil excitation is phase displaced from the others by one-third of a power-frequency electrical cycle, corresponding to the desired output amplitude, frequency and phasing of the three power-frequency outputs to match L1, L2 and L3 of the power grid. The time varying excitation of field coils 100, 200 and 300 are shown in equations 7, 8 and 9, which results may be inserted into equations 1-6 above:

$$A(t) = \sin(\omega^* t) \qquad \text{Equation 7}$$

$$B(t) = \sin(\omega^* t + (2/3)^* \pi) \qquad \text{Equation 8}$$

$$C(t) = \sin(\omega^* t + (4/3)^* \pi) \qquad \text{Equation 9}$$

where t=time in seconds, and

ω=radial frequency (377 rad/s at 60 Hz,) or (314 rad/s at 50 Hz)

Figure 6B:
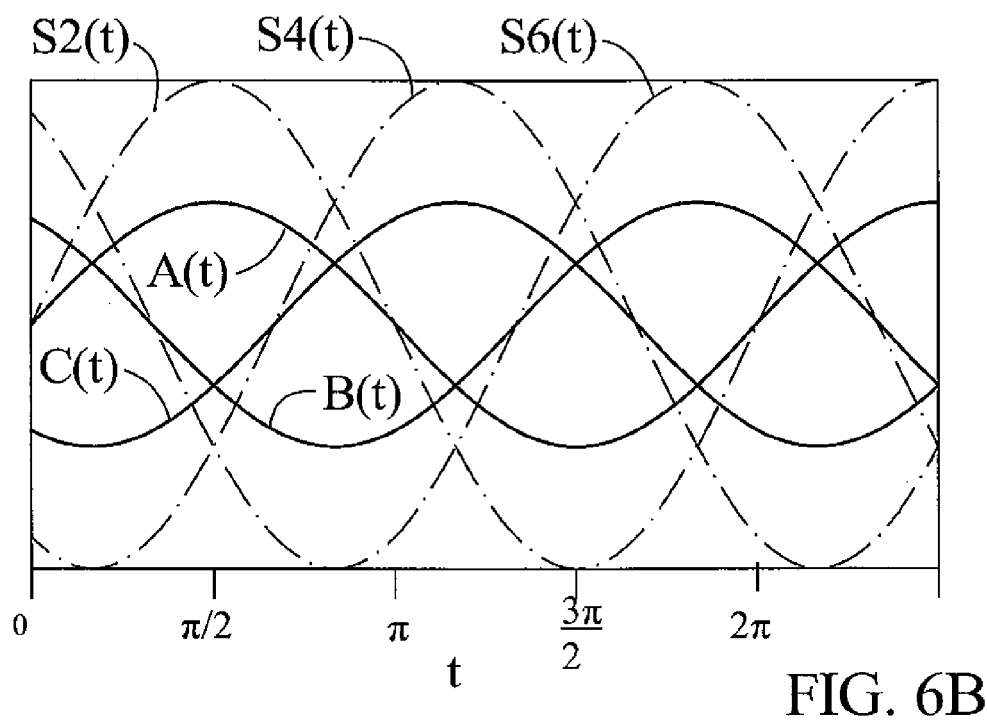
FIG. 6B shows a graph of the time varying net air gap magnetic excitation in the various circumferential sectors of the stator.

FIG. 6B shows the pattern of time varying level of net magnetic excitation in sectors S2, S4 and S6 as compared to the instantaneous excitation from field coil 100, A(t), field coil 200, B(t), and field coil 300, C(t). Note that net excitation in sector S2 (ES2) is exactly in phase with the primary excitation A(t), but has an amplitude twice that of the primary excitation A(t). Note that net excitation in sector S4 (ES4) is exactly in phase with the primary excitation C(t), but has an amplitude twice that of the primary excitation C(t). Note that net excitation in sector S6 (ES6) is exactly in phase with the primary excitation B(t), but has an amplitude twice that of the primary excitation B(t).

The net excitations in sectors S2, S4 and S6 shown in FIG. 6B are similar except for a phase displacement of one-third of an excitation cycle from each other. It can also be shown by examination of equations 1 through 6 that the net excitation of a pair of diametrically opposed sectors such as (S2 and S5), or pair (S3 and S6), or pair (S1 and S4) are in perfect phase but have opposite polarity.

It is important for understanding the present invention that it be emphasized here that the net instantaneous magnetic excitation is uniform along the circumference of each individual sector, although varying sinusoidal in time. This is unlike the spatially varying net magnetic excitation in induction machines, where windings are generally arranged to give a sinusoidal spatial distribution of net magnetic excitation that then changes with time. Given this uniform excitation within a sector, the movement of flux concentration caused by the motion of the rotor teeth 44 will create a uniform amplitude of voltage in high frequency subphase windings within the sector, with the amplitude proportional to the level of net magnetic excitation.

It will be understood by those familiar with the art that, if the excitation frequency is chosen as the desired power-frequency (50 or 60 Hz) that the voltage, induced by rotor motion, in subphase pole winding 114 located in sector S2, will be a high-frequency alternation, with frequency dependent on rotor speed, but with the amplitude of the high-frequency alternations modulated at the desired power-frequency, exactly analogous desired high-frequency output voltage 152 of the alternator 10 of the present invention is achieved. With proper interconnection, subphase pole winding 116 located in sector S5 can be made to augment the voltage of the subphase pole winding 114 located in sector S2, even though the polarity of interconnection of the windings in one sector may need to be reversed to account for the opposite polarity of the excitation in this pair of sectors. So it will be understood that sectors 82 and S5 can together be used as magnetic core 102 of the present invention with net magnetic excitation corresponding to the electric current excitation A(t) in field coil 100.

By consideration of the arrangement of the invention as shown in FIG. 5 with the characteristics shown in FIG. 6B it can be seen that the present invention achieves the object to produce an alternator with multiple distinct sectors of air gap magnetic excitation spaced around the circumference of the stator 50 such that at each sector, the time varying net air gap magnetic excitation level, and thereby the amplitude of the induced high-frequency voltage within that sector, corresponds to the desired time varying amplitude and phasing of one of the desired power-frequency output phases.

It will be further understood by those familiar with the art that high-frequency subphase winding 108 can be established by interconnecting particular individual subphase pole windings 114 and 116 located in sectors S1 and S5. High-frequency subphase winding 110 can be established by interconnecting other individual subphase pole windings 114 and 116 in sectors S2 and S5 that are circumferentially offset from those of high-frequency subphase winding 108, by a fraction, typically one-third, of the circumferential spacing of rotor teeth 44. High-frequency subphase winding 112 can be established in sectors S2 and S5 by interconnecting still other individual subphase pole windings 114 and 116 that are circumferentially offset from those of high-frequency subphase windings 108 and 110, by a fraction, typically one-third, of the circumferential spacing of rotor teeth 44. These high-frequency subphase windings 108/110/112 can be interconnected into intermediate alternator 118 coupled to and in phase with the excitation of field coil 100 via sectors S1 and S5, which represent magnetic core 102.

Similar arrangements can be made in sector pairs S1 and S4, and S3 and S6, which correspond to magnetic cores 202 and 302 respectively. It will again be noted that the power-frequency excitation in each set of sector pairs is phase displaced by one-third of a power-frequency electrical cycle from each other and from pair S2 and S5 that corresponds to magnetic core 102. It will be understood that intermediate alternator 218 is coupled by magnetic core 202 in phase with field coil 200 and that intermediate alternator 318 is coupled by magnetic core 302 in phase with field coil 300. Motion of the rotor 40 relative to the stator 50 will cause multiple high-frequency outputs 152, modulated in phase with current in field coil 100, high-frequency output 252, modulated in phase with currents in field coil 200, and high-frequency output 352, modulated in phase with currents in field coil 300. Once rectified in respective means 120, 220 and 320 and then commutated in respective means 130, 230 and 330, these high frequency outputs will lose their high frequency character and become power-frequency AC outputs 156, 256 and 356, which are also phase displaced by one-third of a power-frequency electrical cycle from each other. Thus, the disclosed arrangement achieves the objectives of creating a single high-frequency alternator incorporating three power-frequency phases within a single high-frequency alternator that allows variable speed shaft operation with power-frequency output. The disclosed arrangement also achieves the objective to create an alternator in which each of the power-frequency output phases is created by the rectified output of multiple subphases, wherein the output amplitude, frequency and phase of each power-frequency output phase can be excited and controlled by currents within field windings.

Figure 7:
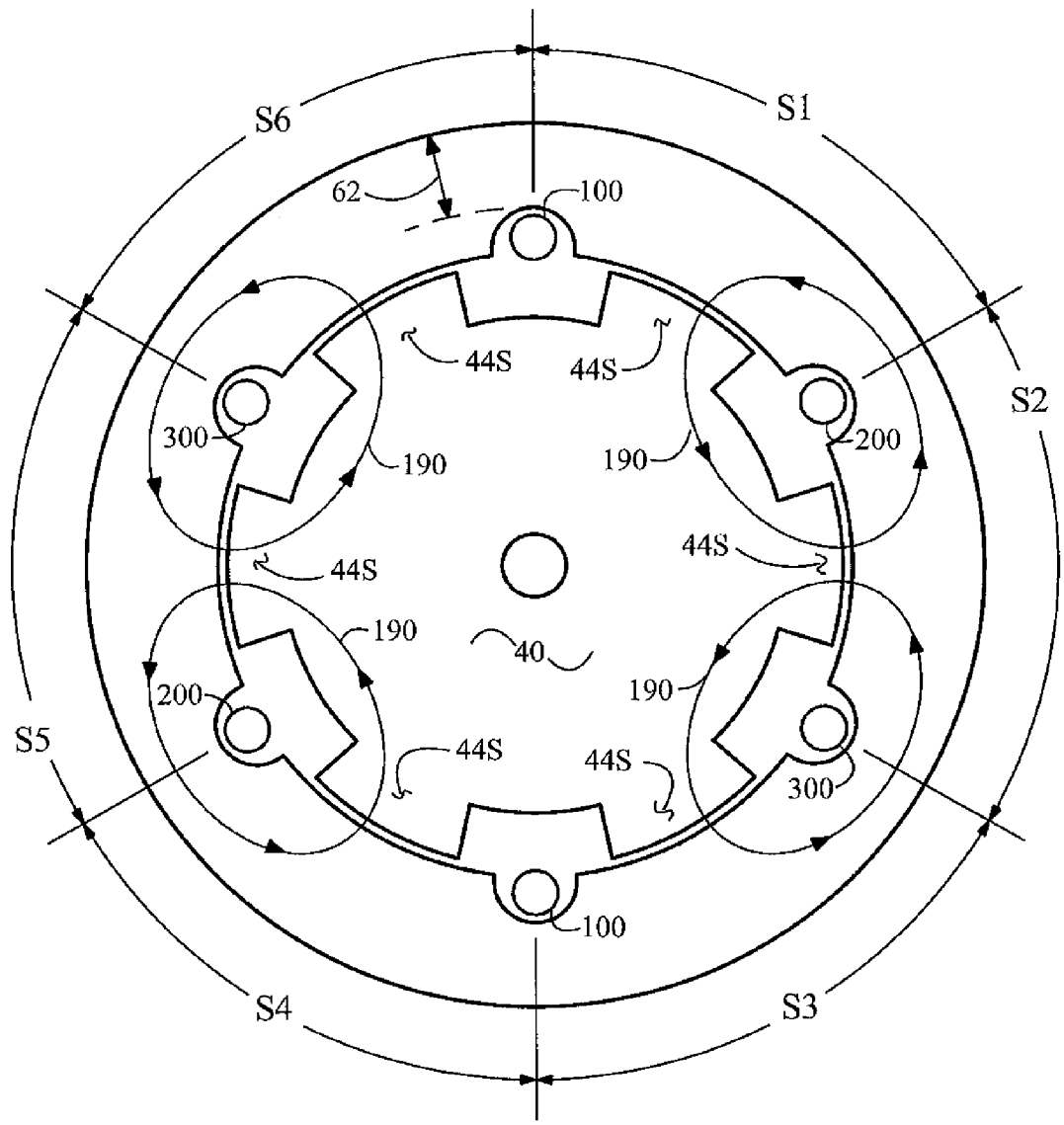
FIG. 7 shows a simplified diagram of flow of net magnetic flux through the backiron of the stator with three-phase excitation of the field coils of the preferred embodiment.

Further advantages of the present invention are illustrated by FIG. 7, in which a simplified magnetic core is shown with all teeth 44 within each sector S1-S6 represented by a single rotor tooth 44S in each sector, and in which, at the level of magnetic excitation representing the threshold of magnetic saturation, there are schematically two lines of flux 190 per simplified tooth 44S. (High-frequency winding slots 56 have been left out for clarity). The operation of the embodiment shown in this figure assumes that the excitation in field coil windings 100, 200 and 300 corresponds to time t1 defined, in FIG. 6B, as the moment of peak excitation in sector S2. As can be seen from FIG. 6B, at this instant t1 sector S2 has (+2) lines of magnetic flux (where the plus sign indicates the direction of flux lines 190 flowing from the rotor 40 toward the stator 50). Also, at this instant, sector S1 has −1 lines of magnetic flux (where the minus sign indicates the direction of flux lines 190 flowing toward the rotor 40 from the stator 50). Examination will show that the flow of flux lines in FIG. 7 corresponds to the flux flow in each sector at time t1 as indicated in FIG. 6B. The completion of the flux lines gives the schematic pattern of flux distribution in the rotor 40 and backiron 62. It will be noted that at this moment of peak excitation of sector S2, the backiron 62 outside of field coil 200 carries just one line of magnetic flux 190, representing one half of the saturation level of flux passing through the tooth 44B representation in sector S2. Similar to the discussion for the case of FIG. 5, the backiron 62 must be sized to carry one half of the saturation level of flux passing through the rotor tooth 44B representation in sector S2. However, in contrast to the discussion regarding the apparatus of FIG. 5, sector S2 in FIG. 7 is one-third of the circumferential sector S10 of FIG. 5, so the maximum flux level to be carried by the backiron 62 is one-third that indicated for the apparatus of FIG. 5.

The synergistic three-phase operation of the three field coil windings 100, 200 and 300 in the embodiment of the apparatus represented in FIG. 7 allows smaller backiron 62 dimensions, less diameter and less material and weight for the same level of magnetic excitation, resulting in a smaller and lighter machine than would be implied by simply studying the excitation of field coil 100 alone as illustrated in FIG. 5.

It should also be noted that in the apparatus of FIG. 5, the level of magnetic excitation along sector S10, including sector S2, is directly proportional to the level of excitation current in field coil winding 100. In contrast, it may be inferred from FIG. 6B that the level of magnetic excitation in sector S2 will be similarly proportional to twice the level of magnetic excitation due to the current in field coil winding 100 alone. This, too, is due to the synergistic three-phase operation of the three field coil windings 100, 200 and 300. This synergistic effect allows a desired level of magnetic excitation to be achieved with one-half of the electrical current within each field coil that would be required without the synergistic effect. Since field coil resistance losses of a material such as copper are proportional to the square of the current level, cutting the excitation currents in half reduces these losses by a factor of four, thus helping to achieve an important objective of the present invention.

Figure 8:
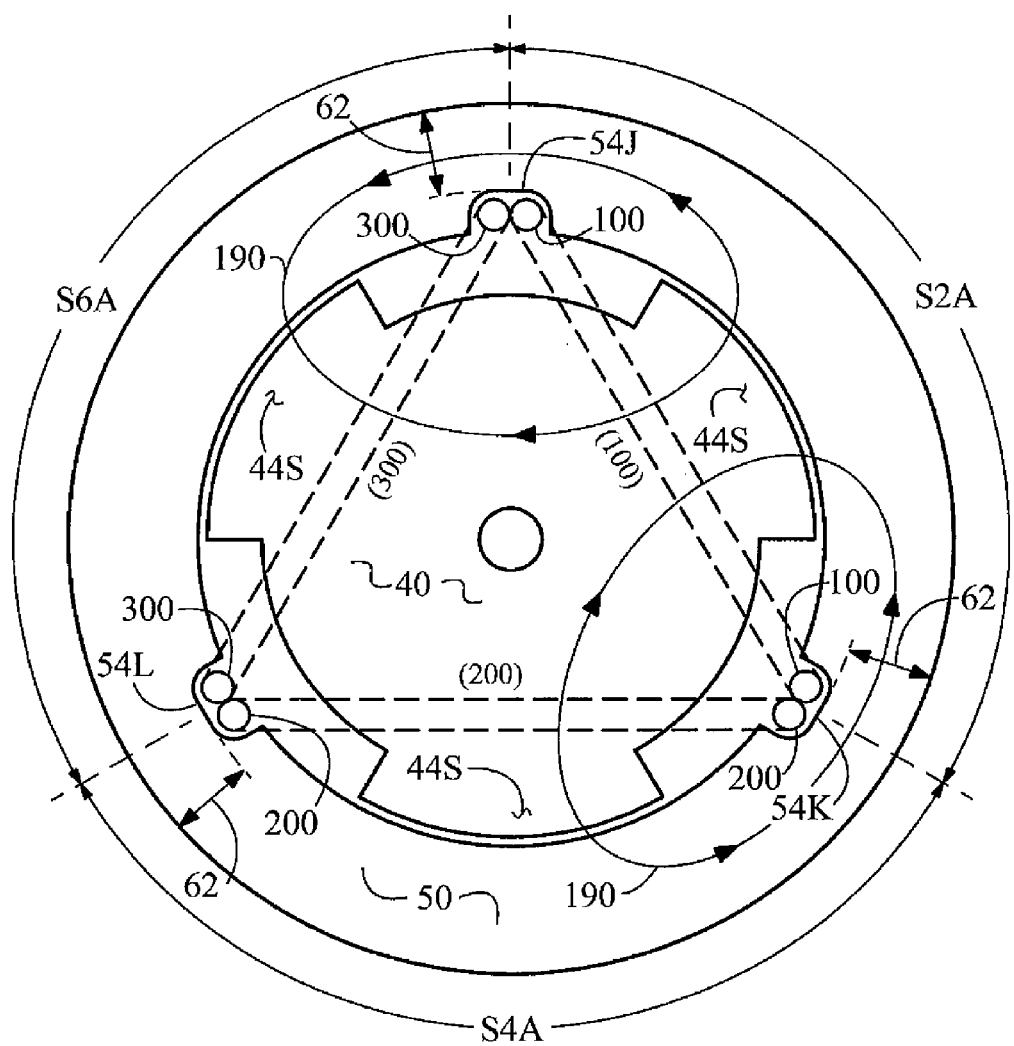
FIG. 8 shows a simplified diagram of flow of magnetic flux in a first alternate embodiment.

FIG. 8 shows a simplified schematic of a first alternate embodiment of the present invention wherein the three field coil windings 100, 200 and 300 are arranged to each encompass one-third of the circumference of the inner circumference of stator 50. In this embodiment, there are only three field coil winding slots 54J, 54K and 54L spaced evenly around the circumference of the inner diameter of the stator 50. In this embodiment field coil winding 100 spans from one field coil winding slot 54J to the adjacent field coil winding slot 54K, which it shares with the windings of field coil winding 200. Similarly, in this embodiment, field coil winding 200 spans from one field coil winding slot 54K to the adjacent field coil winding slot 54L, which it shares with the windings of field coil winding 300. Similarly, in this embodiment, field coil winding 300 spans from one field coil winding slot 54L to the adjacent field coil winding slot 54J, which it shares with the windings of field coil winding 100; completing the circumference. It can be shown that when the field coil windings 100, 200 and 300 are excited by electrical currents as described in equations 7, 8 and 9, then the net magnetic excitation in the sectors of the stator inner circumference labeled S2A, S4A and S6A of FIG. 8 correspond to the time varying excitation levels for sectors S2, S4 and S6 shown in the graph of FIG. 6B. Therefore, sector S2A corresponds to magnetic core 102, sector S4A to that of magnetic core 202, and sector S6A to that of magnetic core 302, thus achieving another objective of the present invention.

In FIG. 8, the magnetic core comprising the rotor 40 and the stator 50 is shown with all rotor teeth 44 within each sector S1A, S2A, S3A (represented by a single rotor tooth 44S in each sector), and in which, at the level of magnetic excitation representing the threshold of magnetic saturation, there are schematically two lines of flux 190 per simplified tooth 44S. In this embodiment of the invention it is assumed that the excitations in field coil windings 100, 200 and 300 correspond to time t1 previously described with respect to FIG. 6B, as the moment of peak excitation in sector S2. It will be noted that at this moment of peak excitation of sector S2A, the backiron 62 outside of field coil slot 105B carries just one line of magnetic flux 190, representing one half of the saturation level of flux passing through the tooth 44S representation in sector S2A. Similar to the discussion for the embodiment of FIG. 7, the backiron 62 must be sized to carry one-half of the saturation level of flux passing through the rotor tooth 44S representation in sector S2A. However, in contrast to the embodiment of FIG. 7, sector S2A in FIG. 8 is twice the length of circumferential sector S2 of the embodiment of FIG. 7, so the maximum flux level to be carried by the backiron 62 in FIG. 8 is twice that indicated for the embodiment of FIG. 7, and the backiron 62 must be sized accordingly.

Although either of the embodiments of the present invention represented by FIGS. 7 and 8 will achieve the objectives of the present invention, a comparison of those embodiments illustrates an advantage of the embodiment presented in FIG. 7. Specifically, the embodiment represented by FIG. 7 allows smaller backiron 62 dimensions, less diameter and less material and weight for the same level of magnetic excitation, resulting in a smaller and lighter machine when compared to the embodiment of FIG. 8. However, this advantage comes primarily by limiting the circumferential extent of the individual sectors (S1, S2 . . . S6), since the depth of the backiron 62 required to prevent magnetic saturation has been shown to be proportional to one-quarter of the circumference of the inner diameter of the stator 50 encompassed by the sector. As will be described and illustrated later, this can be used to advantage in other alternate embodiments.

It will be further understood by those skilled in the art that the high-frequency subphase pole windings 114 and 116 will be excited at a high-frequency that is the product of the frequency of rotation of the shaft 20 shown in FIG. 2 (or other suitable means of rotation) times the number of rotor teeth 44, and that the voltage induced in each subphase pole winding per unit axial length will be proportional to the product of the excitation frequency multiplied the number of turns per pole multiplied by the instantaneous level of magnetic flux. Voltage production in the high-frequency subphase windings such as winding 108, may be increased by increasing any combination of the net magnetic excitation level, the axial length of the magnetic core, the number of high frequency turns per pole, or the number of poles, which is related to the number of rotor teeth 44 as previously described. For a high speed machine with a high speed of shaft rotation, such as an alternator driven by a gas turbine, a low number of rotor teeth 44, such as schematically indicated in FIG. 8, may be sufficient to generate the needed voltage. Even when using natural rectification processes, there are switching losses that eventually limit the efficiency of high-frequency rectification. A low number of poles can offset a high speed of shaft rotation to keep the switching frequency within normal limits. The rotational speed of the shaft 20 can be also be adjusted up or down from the shaft speed of the driving source of rotary power 12 by the transmission 14, but transmissions introduce their own complications into the system. The flexibility to adjust nominal range of high-frequency alternations of the alternator 10 by selection the number of rotor teeth 44, instead of by employing a transmission, is an advantage offered by the present invention.

At the other end of the spectrum of speeds of sources of rotary power represented by source 12, devices such as wind mills turn relatively slowly. In this case, a rotor with a higher number of rotor teeth will increase the high-frequency alternation frequency and the voltage induced in each high-frequency rotor pole. As noted in U.S. Pat. No. 6,051,959, there is a practical minimum frequency that the high-frequency alternations must achieve above the desired power-frequency for the rectification and modulation system to be most effective. The ability to add more teeth 44 to the circumference of the rotor 40, and thus add more poles, provides flexibility through the present invention to achieve the minimum required high-frequency alternator frequency for cases of slow rotation of the shaft 20.

It will be understood by those skilled in the art that the high-frequency subphase pole windings 114, 116, and high-frequency subphase windings such as winding 108, and subphase winding slots 56 should all be adjusted in physical dimension as the circumferential dimensions of the rotor teeth 44 are adjusted. However, these all remain conceptually similar regardless of the number of rotor teeth 44.

Figure 9:
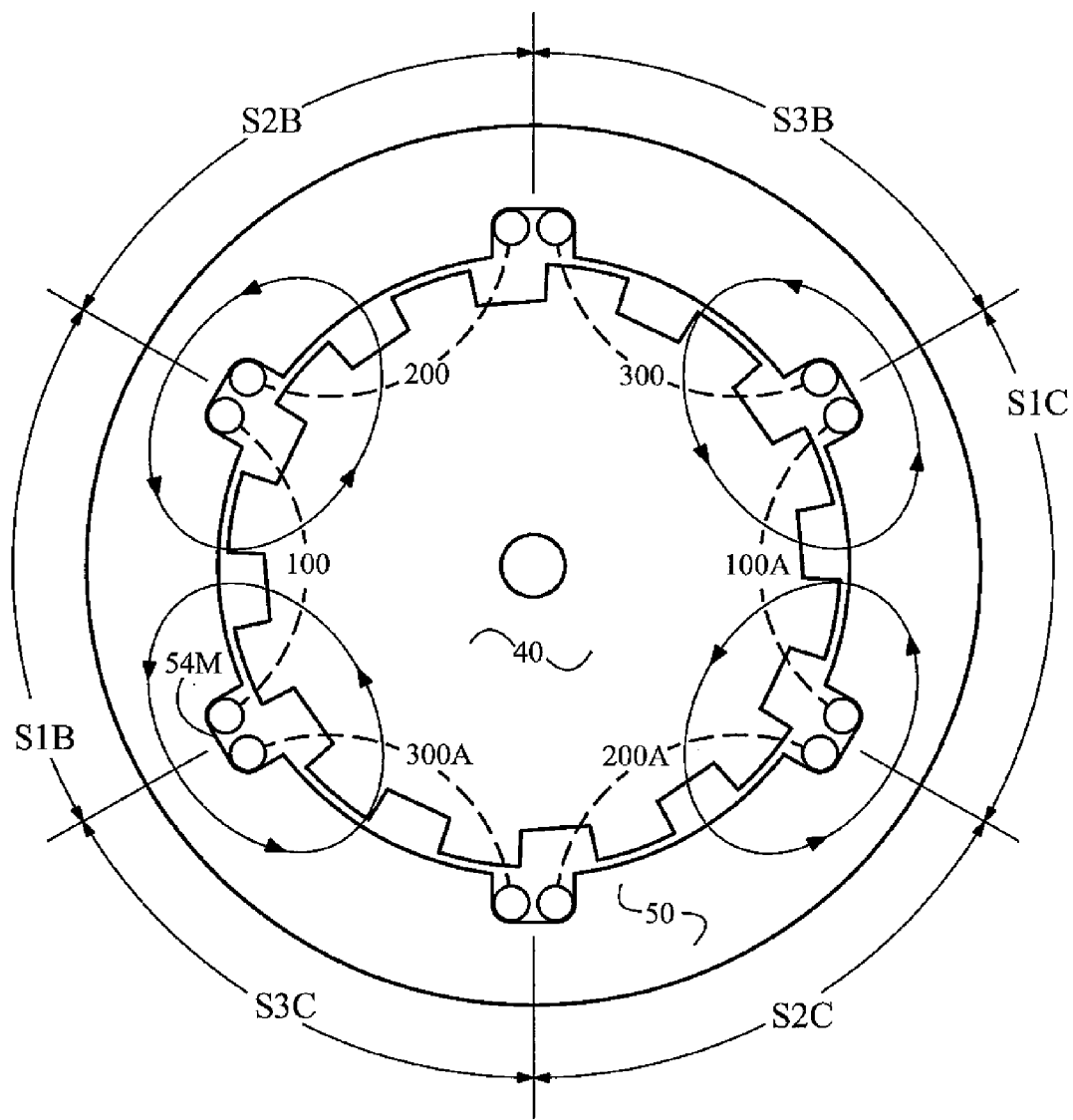
FIG. 9 shows a simplified diagram of flow of magnetic flux in a second alternate embodiment.

FIG. 9 schematically shows a simplified third embodiment of the apparatus of the present invention, which is an extension of the pattern of sectors and field coil arrangements of the second embodiment shown in FIG. 8. Here, the span of each field coil 100, 200, 300 of a first series of field coils encompasses only one-sixth of the circumference and there is a second series of field coils 100A, 200A and 300A, where field coil 100A is excited in common with field coil 100, field coil 200A is excited in common with field coil 200, and field coil 300A is excited in common with field coil 300. Adjacent field coils share a common field coil winding slot, wherein field coil 300A shares field coil winding slot 54M with field coil 100, and so on around the rotor 40 and stator 50 combination until completing the circumference as shown. If field coil pairs 100/100A, 200/200A and 300/300A are excited as in equations 7, 8 and 9, respectively, it can be shown that the net air gap magnetic excitation of sectors S1B and S1C correspond to the electrical current excitation in field coil winding 100, the net air gap magnetic excitation of sectors S2B and S2C correspond to the electrical current excitation in field coil winding 200, and the net air gap magnetic excitation of sectors S3B and S3C correspond to the electrical current excitation in field coil winding 300. This pattern of net air gap magnetic excitation is similar to that of the embodiment shown in FIG. 7, with the exception of a reversal of polarity of excitation in sectors S1C, S2C and S3C. The reversal in polarity can be handled by appropriate interconnection of subphase pole windings in these sectors.

In the case of the embodiment of the invention shown in FIG. 5, only three field coil windings 100, 200 and 300 are needed. In the embodiment of FIG. 9, six field coil windings are required: 100, excited in phase with 100a; 200, excited in phase with 200a; and 300 excited in phase with 300a. The designer has the flexibility to select the field coil winding method of FIG. 5 or the field coil winding method of FIG. 9, as convenient for a particular machine, while achieving the same pattern of excitation for three-phase power output.

It will be noted that by dividing up the circumference of the rotor 40 and stator 50 combination into smaller sectors, the local amount of flux that needs to be carried by the backiron 62 is reduced proportionately. For cases wherein the source of rotary power 12 rotates very slowly, as in the case of direct drive windmills, a very large circumference may be required in order to accommodate enough rotor teeth 44 to get to a desirable minimum frequency for the high-frequency alternations. The dimension of backiron 62 can be minimized by breaking the circumference into numerous sectors of excitation so that the excitation pattern of the sectors can be made to follow the pattern of three-phase power.

Figure 10:
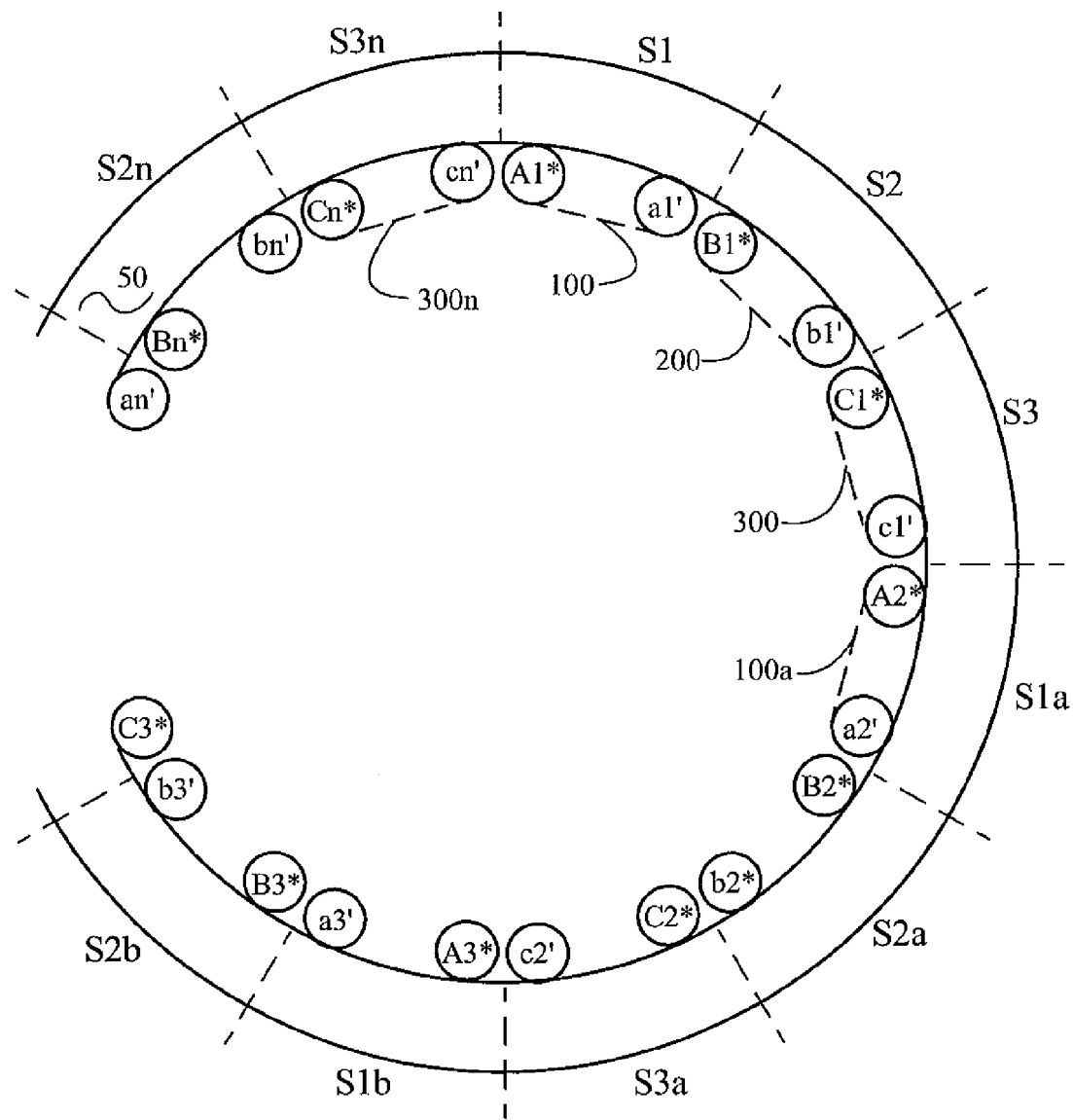
FIG. 10 shows a generalized schematic of a third alternate embodiment with multiple repetitions of a serial arrangement of field coils spaced around the inner circumference of the stator.

FIG. 10 shows a sketch for an alternate embodiment of the apparatus of the present invention incorporating a pattern of a plurality of field coils 100, 200, 300, in a repeating pattern of adjacent field coils through . . . 100n, 200n, 300n, where n represents an arbitrary positive integer number, with the field coils preferably spaced equally around the circumference of the stator 50. Field coils 100, 100a, through 100n are all excited equally in phase with the currents in field coil winding 100. Field coils 200, 200a, through 200n are all excited equally in phase with the currents in field coil winding 200. Field coils 300, 300a, through 300n are all excited equally in phase with the currents in field coil winding 300. It can be shown that, if the field coils 100, 200 and 300 are given the three-phase power-frequency excitation of Equations 7, 8 and 9, then for each sector the net magnetic excitation is proportional to excitation current of a particular field coil i.e:

$$ES1(t)=2A(t)$$

$$ES2(t)=2B(t)$$

$$ES3(t)=2C(t),$$

and that this pattern repeats for each of n series of sectors completing the circumference of the stator with:

$$ES1n(t)=2A(t)$$

$$ES2n(t)=2B(t)$$

$$ES3n(t)=2C(t)$$

This arrangement achieves various objectives of the present invention while breaking the circumference into numerous sectors of excitation to minimize the requirement for back-iron dimension.

Figure 11:
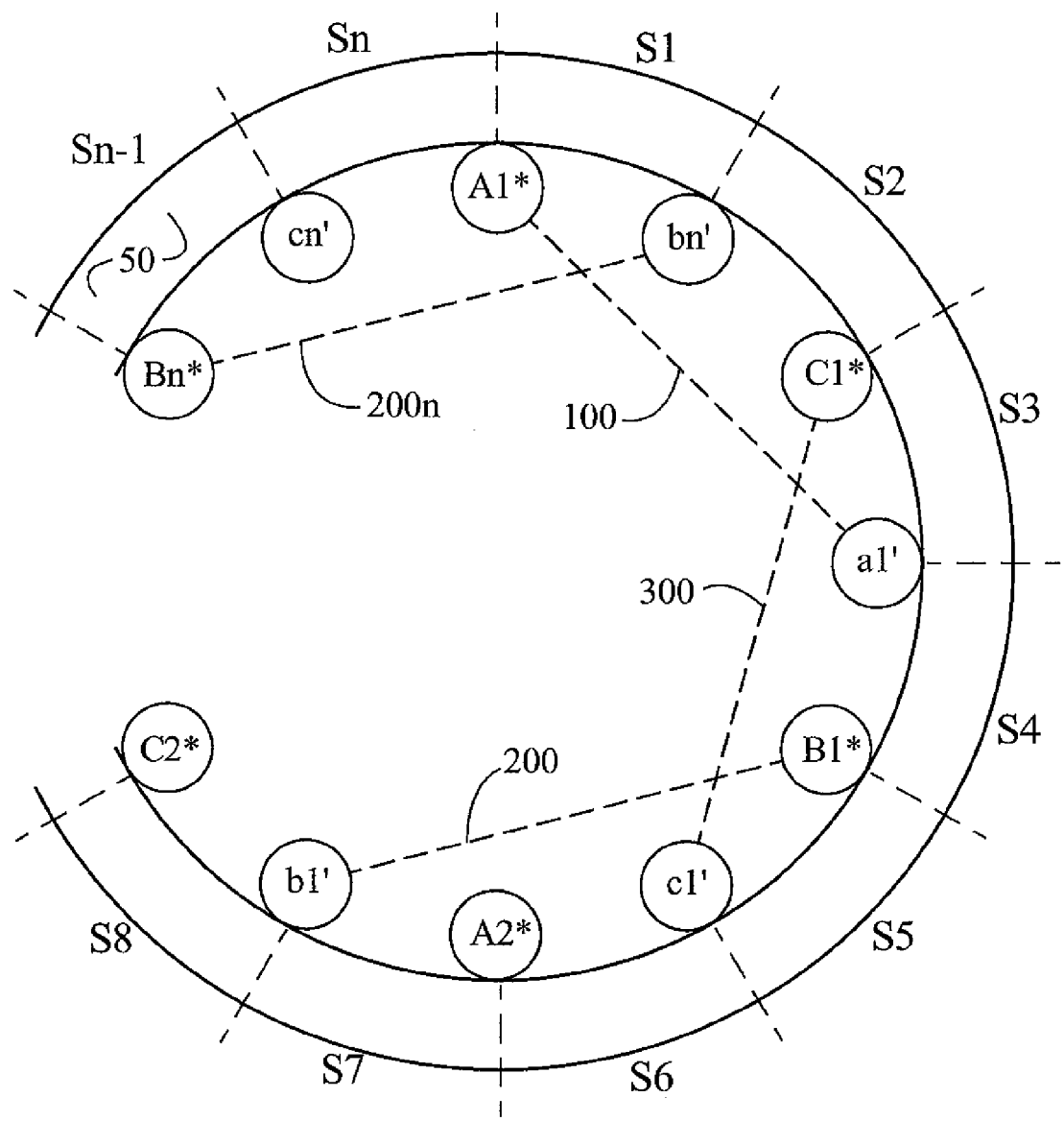
FIG. 11 shows a generalized schematic of a fourth alternate embodiment with multiple repetitions of interwoven field coil distribution spaced around the inner circumference of the stator.

FIG. 11 shows another alternate embodiment of the apparatus of the present invention incorporating a plurality of field coils 100, 200, 300, through . . . 100n, 200n, 300n, where "n" represents an arbitrary positive integer number, in a repeating pattern where adjacent field coil windings of the field coils overlap each other by one-third of the circumferential sector encompassed by each field coil winding. This leads to a repeating sequence of field coils A*, b', C*, a', B*, c' where A* has current coming out of the plane of the paper, a' has current going into the plane of the figure and so on, and where field coil 100n is formed of coil An* connected by endloops to coil an', field coil 200n is formed of coil Bn* connected by endloops to coil bn', and field coil 300n is formed of coil Cn* connected by endloops to coil cn'. That is, in this embodiment, the second field coil winding passes of each field coil are placed in the field coil winding slot third-most-immediately-adjacent, in the circumferential sequence of field coil winding slots, to the field coil winding slot occupied by the first field coil winding passes of the same field coil. In this embodiment, field coil winding passes do not share individual field coil winding slots. Also in this embodiment, the field coils are spread, preferably evenly, around the inner circumference of the stator 50. Field coils 100, 100a, through 100n are all excited equally in phase with the current A(t) in field coil winding 100. Field coils 200, 200a, through 200n are all excited equally in phase with the current B(t) in field coil winding 200. Field coil 300, 300a, through 300n are all excited equally in phase with the current C(t) in field coil winding 300. It can be shown that, if the field coils 100, 200 and 300 are given the three-phase sinusoidal power-frequency excitation of equations 7, 8 and 9, then the net magnetic excitation of each sector is proportional to excitation current of a particular field coil, i.e.:

$$ES1(t)=-2C(t)$$

$$ES2(t)=+2A(t)$$

$$ES3(t)=-2B(t)$$

$$ES4(t)=+2C(t)$$

$$ES5(t)=-2A(t)$$

$$ES6(t)=+2B(t)$$

This pattern repeats for each of the "n" series of sectors completing the pattern around the circumference of the stator. As noted before, the reversal in polarity in various sectors can be handled by appropriate interconnection of subphase pole windings in these sectors.

Figure 12:
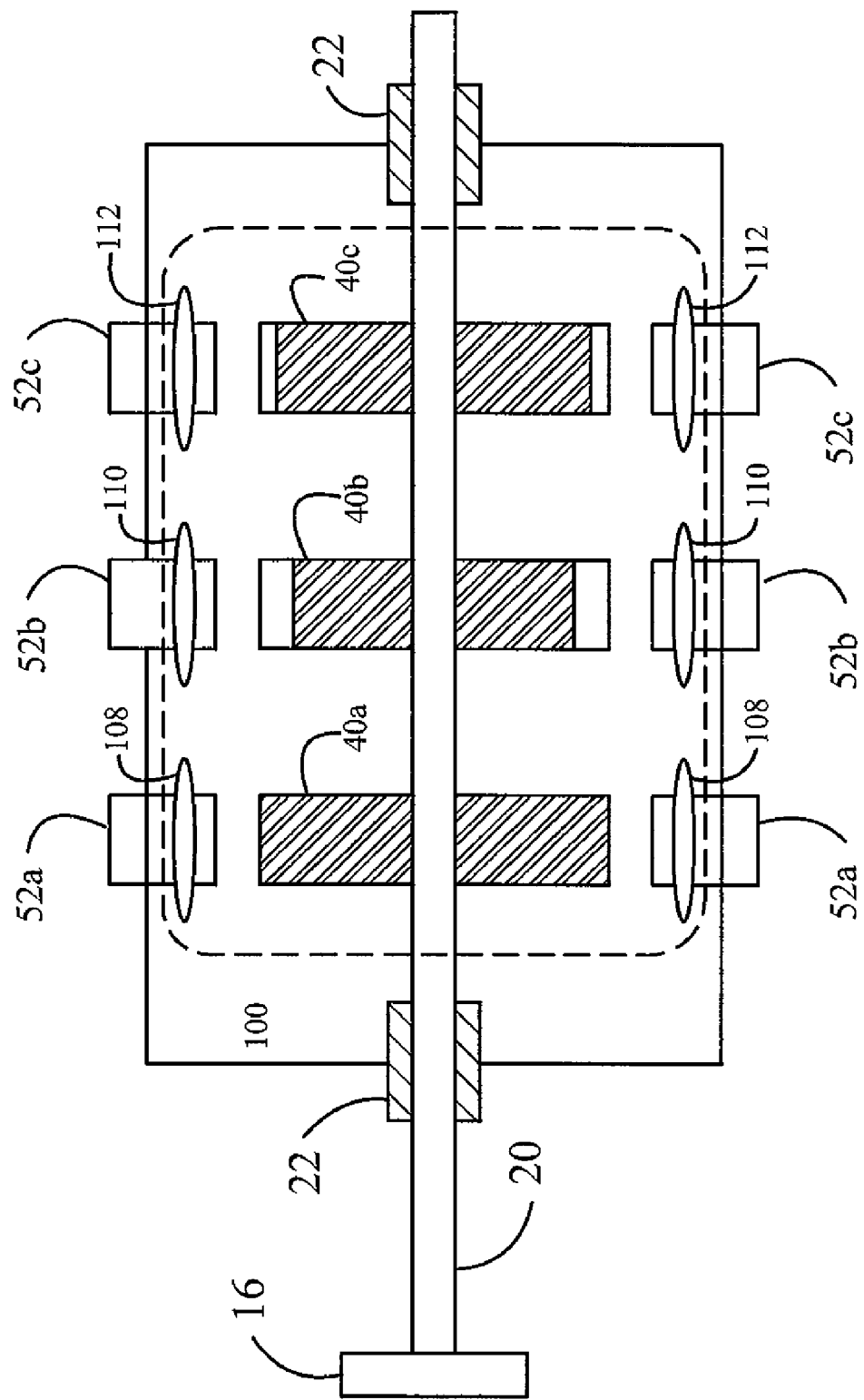
FIG. 12 shows an axial cross section through a fifth alternate embodiment with the high-frequency subphases spread among individual stages of the magnetic core.

As the number of high-frequency subphase pole windings 116, 114 of a subphase winding 108 is increased by decreasing the circumferential dimension of the rotor teeth 44, there comes a minimum size of the high-frequency subphase pole windings 116, 114 where the high-frequency subphase winding slots 56 of other subphase windings (here 110 and 112) on a single stator will interfere with the magnetic flux path provided by the stator teeth 46 by limiting the circumferential dimension thereof. To address this issue, an embodiment of the invention shown in FIG. 12 provides an alternative wherein there are three separate stator ring sets 50a, 50b and 50c, arranged to each communicate with respective sets of corresponding axial rotor segments 40a, 40b, and 40c, all of which rotors are connected to and driven by a common shaft 20. The stator ring sets 50a, 50b and 50c and corresponding axial rotor segments 40a, 40b, and 40c are excited by common field coils 100, 200 and 300 as previously described. Because of this common excitation, it will be understood that each stator ring will have a similar set of sectors along its circumference with excitation reflecting the three-phase currents in the field coils as indicated with reference to embodiments earlier described herein.

The windings for the high-frequency subphase winding 108 of the embodiment shown in FIG. 12 are on one of the stator rings, such as stator rings 50a, while the subphase windings 110 and 112 are on stator rings 50b and 50c, respectively. In this arrangement, the high-frequency subphases are not circumferentially interwoven on a single stator ring, as in the embodiments previously described. In this embodiment, it is important to arrange the high-frequency subphase windings 108, 110 and 112 for each sector with dissimilar phasing of their individual single-phase high-frequency alternating electrical outputs in order to produce multi-phase high-frequency electrical output suitable for rectification. To accomplish this, the circumferential positional relationship between rotor teeth 44 on axial rotor segment 40a and the corresponding high-frequency subphase winding 108 on stator ring 50a may be displaced, typically by one-third of the spacing between the rotor teeth 44, relative to the similar relationship between rotor teeth 44 on axial rotor segment 40b and the corresponding high-frequency subphase winding 110 on stator ring 50b.

With continuing reference to FIG. 12, following this pattern, high-frequency subphase windings 108, 110 and 112 may be arranged such that each distinct high frequency subphase winding is circumferentially displaced from the others, in relationship to the circumferential position of the rotor teeth 44 on their corresponding axial rotor segments. It should be noted that this may be achieved by circumferential displacement of the rotor teeth 44 on the individual axial rotor segments 40a, 40b and 40c. It may alternately be achieved by circumferential displacement of each distinct high frequency subphase winding along the stator rings, 50a, 50b and 50c.

In this embodiment, as the rotor 40 rotates, the voltages induced among the high-frequency subphase windings 108, 110 and 112 are phase displaced by a fraction, typically by one-third, of the high-frequency alternation so that they may be used in the subphase rectifier 120 shown in FIG. 2 in the manner typically associated with such a device. Because the stator teeth 46 are not required to have additional subphase winding slots 56 for other subphases, say, 110 and 112, this arrangement allows the subphase pole windings 114 and 116 of subphase winding 108 to be of smaller circumferential dimension without compromising the magnetic flux path provided by the stator teeth 46. This in turn allows the rotor teeth 44 to be of smaller dimension and thus of a greater number for a given diameter of machine. This is useful for minimizing the diameter of slow speed machines.

The various embodiments of the brushless high-frequency alternator 10B of the present invention are generally suitable for use with the resonant excitation techniques described in U.S. Pat. No. 6,051,959, which allows for minimal expenditure of excitation power. These embodiments are so suited due to:

a) the low core loss arrangements of being constructed of low core loss material by arranging the flux paths to lie almost entirely within the planes perpendicular to the axis of the shaft 20, so that laminates may be used to minimize eddy current losses; and b) the synergistic effects of the three-phase field coils reinforcing the net magnetic excitation of the various sectors so that less field current is needed in each field coil, thus reducing field coil copper losses.

It should be noted that there are additional practical constraints for resonant excitation, including minimizing field coil resistance and breaking up any pathways of high electrical conductivity paths encircling the field coil windings as further explained in U.S. Pat. No. 6,177,746, incorporated herein by reference. The embodiments described herein are suitable for this purpose.

Another practical constraint for using resonant excitation techniques is that the inductance of the field coil should be relatively constant and not significantly dependent on rotor position. In this respect, the embodiment of the invention represented in FIG. 4 is preferred to the embodiment represented in FIG. 5 because as the rotor 40 of FIG. 4 is turned, the number of rotor teeth 44 within each sector remains constant, which is not the case for the embodiment of FIG. 5. This is important because the field coil inductance is heavily dependent on the magnetic energy stored in the air gap 48 between each rotor tooth 44 and the stator 50 and, therefore, changing the number of teeth in the sector as the rotor turns will change the inductance, causing voltage feedback and tuning issues in the resonant circuit. Those familiar with the art will recognize that such practical factors drive the specific design choices among the various embodiments presented, and, for example, the multi stage, axial embodiment of FIG. 12 may be used in combination with the embodiment in FIG. 5. to mitigate the inductance variation issue just described. The described features of the various embodiments of the present invention can be combined to create a flexible, general topology wherein the specifics of the design can be adjusted and optimized for high speed generation, such as micro-turbine operation, or low speed operation such as wind power applications, while maintaining a wide range of variable speed operations relative to the optimal speed. This achieves another objective of the present invention.

Although the system of the present invention has been heretofore described with respect generating three-phase AC line frequency power from variable speed sources of rotary power, the same system and associated excitation methods can be used to advantage in generating other desired variations of electrical power from the variable speed rotation of a shaft, including DC power output, single-phase power-frequency AC output, split-phase (three-wire, single phase, midpoint neutral) power-frequency output, and other desired multi-phased power-frequency outputs. Furthermore these additional non-three-phase embodiments achieve many of the same objectives already described such as brushless operation and the numerous advantages of relatively conventional radial air gap construction.

Single phase operation may be understood by further reference to FIG. 5. wherein the lines of flux 190 due to excitation of a single field coil 100 are shown. If only this field coil is excited, then the same momentary MMF will be present in each sector (S1-S6), and the MMF will be spatially uniform across the circumference of the sectors. Furthermore it will be understood that, as the shaft rotates, the instantaneous magnitude of the voltage generated in the high-frequency subphase pole windings (see 114 in FIG. 4) in the various sectors will be the same, although the sign of the voltage generated within sectors S4, S5 and S6 will be reversed relative to that of the voltage generated within the sectors S1, S2 and S3 due to the inbound versus outbound directions of the flux. If the excitation current in field coil 100 is modulated as a sinusoid at a desired power-frequency, the voltage of the output windings will be modulated at the same power-frequency. The output of multiple phase-displace high-frequency output windings within these sectors is then suitable for rectification into a single phase of power-frequency output in phase with excitation current the field coil 100 and with magnitude proportional to the level of this excitation current.

DC operation can be easily understood from FIG. 5 in that if the excitation current in field coil 100 is held at a constant level then, as the shaft moves, the magnitude of resulting high frequency sinusoid voltages will be held constant and the rectified output voltage will have a constant average (along with a high frequency ripple that is easily filtered in a manner well understood) so the output is suitable for use as a DC power source. The level of DC output will correspond to the field excitation current and may be controlled by adjustments to the field current level.

As was explained in detail for the three-phase version of the present invention, there are multiple options for arranging a plurality of field coils around the inner circumference of stator 50 in a manner such that when the field coils are excited by power-frequency electrical currents, the inner circumference of the stator is divided into a series of discrete circumferential sectors, and each sector will have its own field modulated level of net magnetic excitation (mmf). This mmf will be substantially uniform across the circumference of this sector. It was also shown that the field coils can be further arranged and excited so that the mmf in each sector corresponds to the instantaneous phase and amplitude of a corresponding one of the desired ones of the output line voltages L1, L2, and L3, etc. For a given power line frequency, including DC, this general method may be extended to provide sectors corresponding to an arbitrary number of output phases including single-phase, split-phases (three-wire, single phase, midpoint neutral) and other multiple phases as desired.

Figure 13:
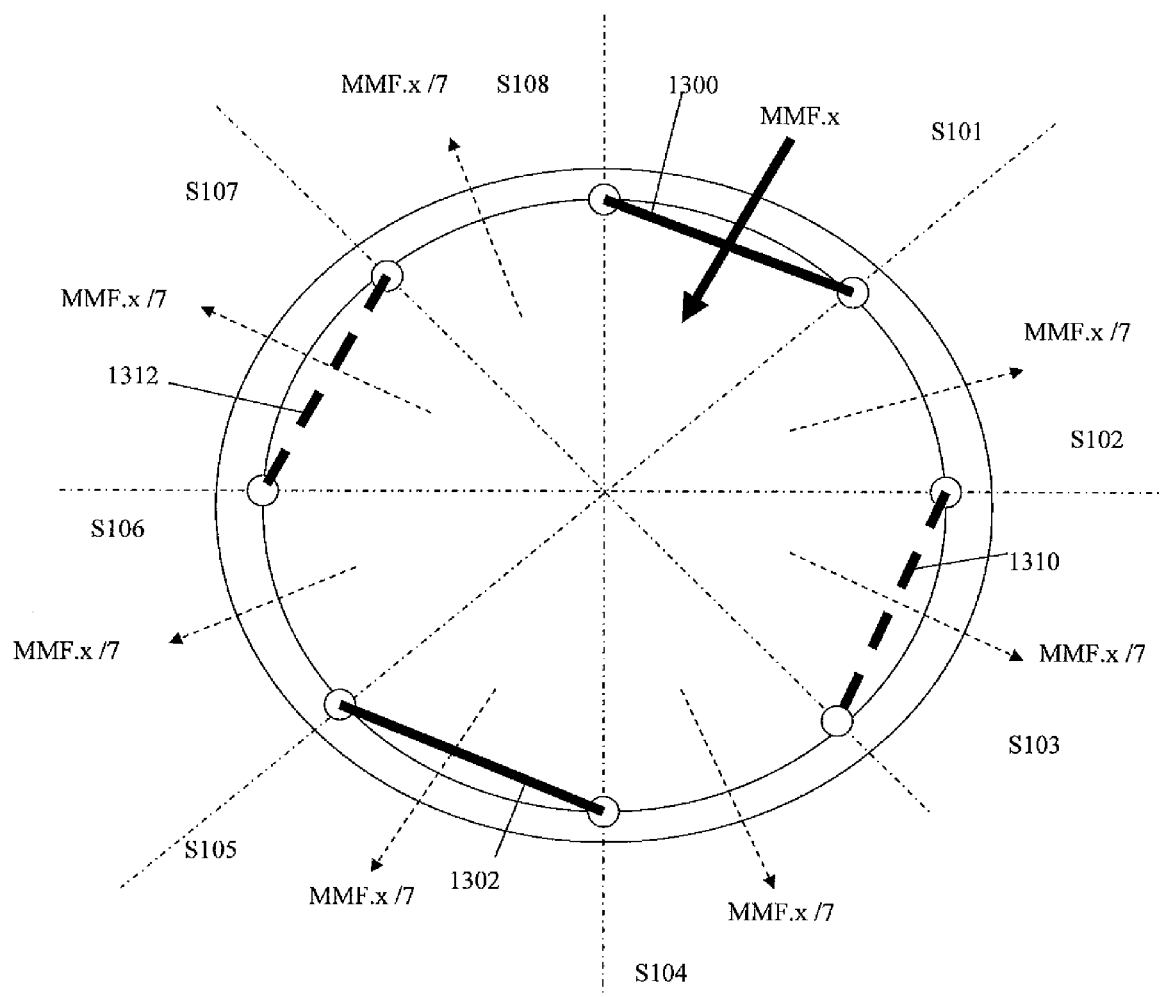
FIG. 13 shows a schematic axial cross section for a sixth alternate embodiment suitable for split-phase (three-wire, single phase, mid-point neutral) power-frequency generation suitable for closed loop control of the magnitudes of each the two power-frequency output phases.

As was explained in detail for the three-phase version of the present invention, there may be interaction of multiple fields in the excitation of each sector. The amount of independence in the control of the voltage produced in a particular sector or group of sectors combined into particular output phase will vary with the particular selection of field windings and excitations. An example demonstrating the ability to exercise closed-loop control over the output voltages of each output of a split phase system (three-wire, single phase, midpoint neutral), that is, being able to arbitrarily adjust the output voltage level for either phase, may be understood with reference to FIG. 13. In this embodiment, the stator is schematically shown with four field coils (1300, 1302, 1310, and 1312) placed so that of eight sectors formed, every other sector is "covered", i.e. field coil 1300 covers sector S101, field coil 1302 covers 5103, etc. Field coils 1300 and 1302 are excited in common (and in phase with the desired line frequency output) to create MMF.x as shown explicitly, as an example, for Sector S101 only. Field coils 1310 and 1312 will also be excited in common (in phase with the desired line frequency output) to a second MMF.y (not shown). FIG. 13 also shows the excitation in each sector due to the inward directed excitation of MMF.x from field coil 1300 in sector S101. Note that in each of the other sectors (S102-S108) the resulting outbound flux is divided up and is of magnitude one seventh of MMF.x. Similar diagrams can be made for the sector by sector flux from inbound MMF due the field currents in the other field coils.

The net mmf in each sector can be found as the result of adding together the mmf from each field coil. In sector S101, the result is that the net mmf will be 6/7*MMF.x(inbound) minus 2/7*MMF.y (outbound). By symmetry, the same result will hold for S105. Similarly, in sectors S103 and S107 the net mmf will be 6/7*MMF.y minus 2/7*MMF.x. In sectors S102, S104, S106, and S108 the net flux (outbound) will be −2/7/*MMF.x+2/7/*MMF.y. The output level of Line 1 (for example, +120 VAC Line 1 to neutral) may be controlled by adjusting the rectified output of the high frequency winding voltages in sectors S101, S102, S105, and S106 and it can be shown that the average output voltage in these windings will be proportional to 4/7*MMF.x+−0/7*MMF.y. Note that this output is primarily controlled by MMF.x. Similarly, the output level of Line 2 (in this case, −120 VAC Line2-neutral) may be taken as the rectified output of high frequency winding voltages in sectors S103 ,S104, S107 and S108 and the average output voltage in these windings will be proportional to 4/7*MMM.y+0/7*MMF.x. Note that this is primarily controlled by MMF.y. If Line 1 output needs additional excitation due to heavy loading (compared to Line 2), then the magnitude of MMF.x can be slightly increased and the magnitude of MMF.y can be slightly decreased until the desired output levels are achieved. This is easily accomplished with well understood closed loop control schemes. Based on the foregoing, this general method may be extended to provide control and excitation to sectors corresponding to an arbitrary number of output phases of a similar power frequency.

It will be noted that the many advantages and objectives achieved for the three-phase preferred embodiments of the present invention described herein are maintained for these alternate configurations for DC, single phase, split-phase and other multiple phase outputs. The desired power-frequency outputs can be made from the variable speed rotation of a shaft without the use of inverters. The device is suitable for stand-alone or grid-tie applications. The multiple power frequency outputs can come from a single high frequency alternator device of brushless design. The general topology is flexible and can be adjusted for a wide variety of speed ranges. In general the magnetic path is radial and circumferential with radial air gaps, making the device suitable for construction from laminated materials suitable for simple construction and minimum complexity and suitable for minimizing core losses. The device is suitable for resonant excitation techniques and minimal power is required in excitation to control substantial amounts of output power.

Although the present invention has been described with respect to various preferred embodiments, it should be realized that the invention is capable of a wide variety of further and other equivalent embodiments deemed to be within the scope and spirit of the inventions as defined by the appended claims.

What is claimed is:

1. A brushless high-frequency alternator device for use in the generation of fixed power-frequency electrical power from an external source of rotary mechanical power into n desired power-frequency output line voltages, L1, L2 . . . Ln, wherein n is any positive integer greater than zero, and wherein each of the output line voltages has a power-frequency time-varying sinusoidal amplitude, and wherein the various output line voltages are phase displaced one from another as required, the device comprising:
   (a) a shaft;
   (b) a rotor coaxial to, and arranged to turn with, rotation of said shaft when coupled thereto;
   (c) a stator having an inner circumference and arranged coaxial to, and separated from, said rotor by a radial air gap;
   (d) a plurality of field coils located on said stator, said field coils arranged for excitation by electrical currents such that the inner circumference of said stator is divided into one or more sets of said integer n discrete circumferential sectors, each sector having a field modulated level of net magnetic excitation (mmf) therein, said mmf being substantially uniform across said sector, and said field coils further arranged so that the mmf in each of the said integer n sectors within each of the one or more sets corresponds to the instantaneous phase and amplitude of a corresponding one of the output line voltages L1, L2, . . . Ln;
   (e) a plurality of high-frequency windings for each of said sectors arranged so that rotation of said rotor generates multiple phases of high-frequency alternating electrical output which are amplitude modulated by the mmf within each of said sectors and also arranged so that the electrical output of each of the multiple high-frequency phases is phase displaced with respect to the electrical outputs of others of the multiple high-frequency phases so as to be suitable for rectification into an amplitude modulated rectified output corresponding in phase and amplitude to one of the output line voltages; and
   (f) means to couple said shaft to the external source of rotary mechanical power.

2. The device of claim 1 wherein said integer n is 1 and the output is single phase.

3. The device of claim 1 wherein said integer n is 2 and the output is split phase, wherein the output level for either phase may be arbitrarily adjusted.

4. The device of claim 1 wherein said power-frequency is 0 Hz and the desired output is DC in nature.

5. The device of claim 1 wherein said rotor and said stator are constructed of low loss magnetic material.

6. The device of claim 1 having more than one set of said integer n discrete sectors, the device further comprising means for interconnecting together the electrical outputs of each of the high-frequency phases from corresponding ones of the different sectors to form interconnected electrical outputs of each of the multiple high-frequency phases prior to rectification thereof into the amplitude modulated rectified outputs corresponding in phase and amplitude to the respective output line voltages.

7. The device of claim 1 wherein the level of mmf for each of the sectors is time varying and uniform across the sector.

8. The device of claim 1 further comprising means to hold said shaft and said stator in relative concentric and axial position with respect to one another, and bearing means arranged to allow said rotor to rotate relative to said stator.

9. The device of claim 1 further comprising first interconnection means for electrically attaching said field coils to an external source of excitation, and second interconnection means for electrically attaching said high-frequency windings to an external rectifier.

* * * * *